United States Patent [19]

Nelson

[11] Patent Number: 4,823,070
[45] Date of Patent: Apr. 18, 1989

[54] SWITCHING VOLTAGE REGULATOR CIRCUIT

[75] Inventor: Carl T. Nelson, San Jose, Calif.

[73] Assignee: Linear Technology Corporation, Milpitas, Calif.

[21] Appl. No.: 82,989

[22] Filed: Aug. 3, 1987

Related U.S. Application Data

[63] Continuation of Ser. No. 932,158, Nov. 18, 1986, abandoned.

[51] Int. Cl.[4] .............................................. G05F 1/563
[52] U.S. Cl. .................................... 323/285; 323/299; 363/21
[58] Field of Search ..................... 363/20, 21, 97, 131; 323/282, 284, 285, 299, 267

[56] References Cited

U.S. PATENT DOCUMENTS

| | | | |
|---|---|---|---|
| 4,146,832 | 3/1979 | McConnell | 323/285 |
| 4,209,826 | 6/1980 | Priegnitz | 363/21 |
| 4,253,137 | 2/1981 | Rao | 363/21 |
| 4,425,612 | 1/1984 | Bahler et al. | 363/21 |
| 4,641,229 | 2/1987 | Easter | 363/21 |
| 4,652,808 | 3/1987 | Mostyn et al. | 323/299 X |

OTHER PUBLICATIONS

Data sheet, "Switching Dc-to-DC Microconverters—LSH 6300 Series", date unknown.
Data sheet, Unitrod UC 1846 Current Mode PWM Controller integrated circuit, 12/83.
Documents relating to the Linear Technology Corporation LT-1070 integrated circuit.

*Primary Examiner*—Patrick R. Salce
*Assistant Examiner*—Kristine Peckman
*Attorney, Agent, or Firm*—Laurence S. Rogers

[57] ABSTRACT

An integrated circuit for use in implementing a switching voltage regulator, the integrated circuit including a power switching transistor, driver circuitry and control circuitry, which is operable in a normal feedback mode or an isolated flyback mode. The integrated circuit includes shutdown circuitry for placing the regulator in a micro-power sleep mode, and can be packaged in a five-pin conventional power transistor package. The terminals of the integrated circuit regulator perform multiple functions. A compensation terminal is used for frequency compensation, current limiting, soft-start operation and shutdown. A feedback terminal is used as a feedback input when the integrated circuit is in feedback mode, and as a logic pin to program the regulator for isolated flyback operation. The feedback terminal is also used to trim the flyback reference voltage.

81 Claims, 8 Drawing Sheets

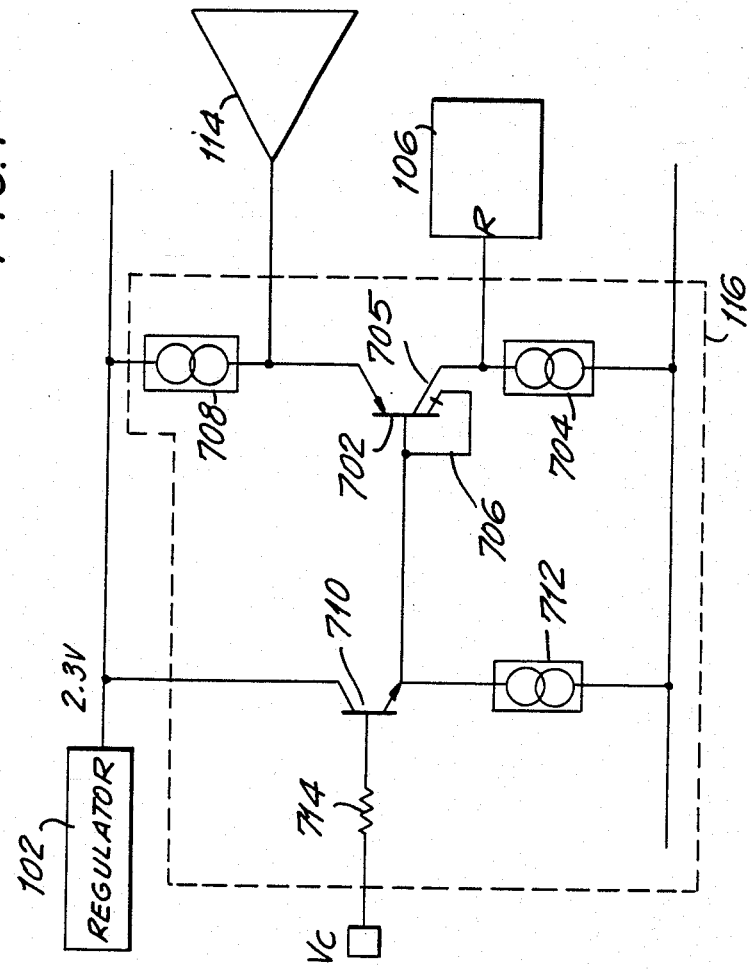

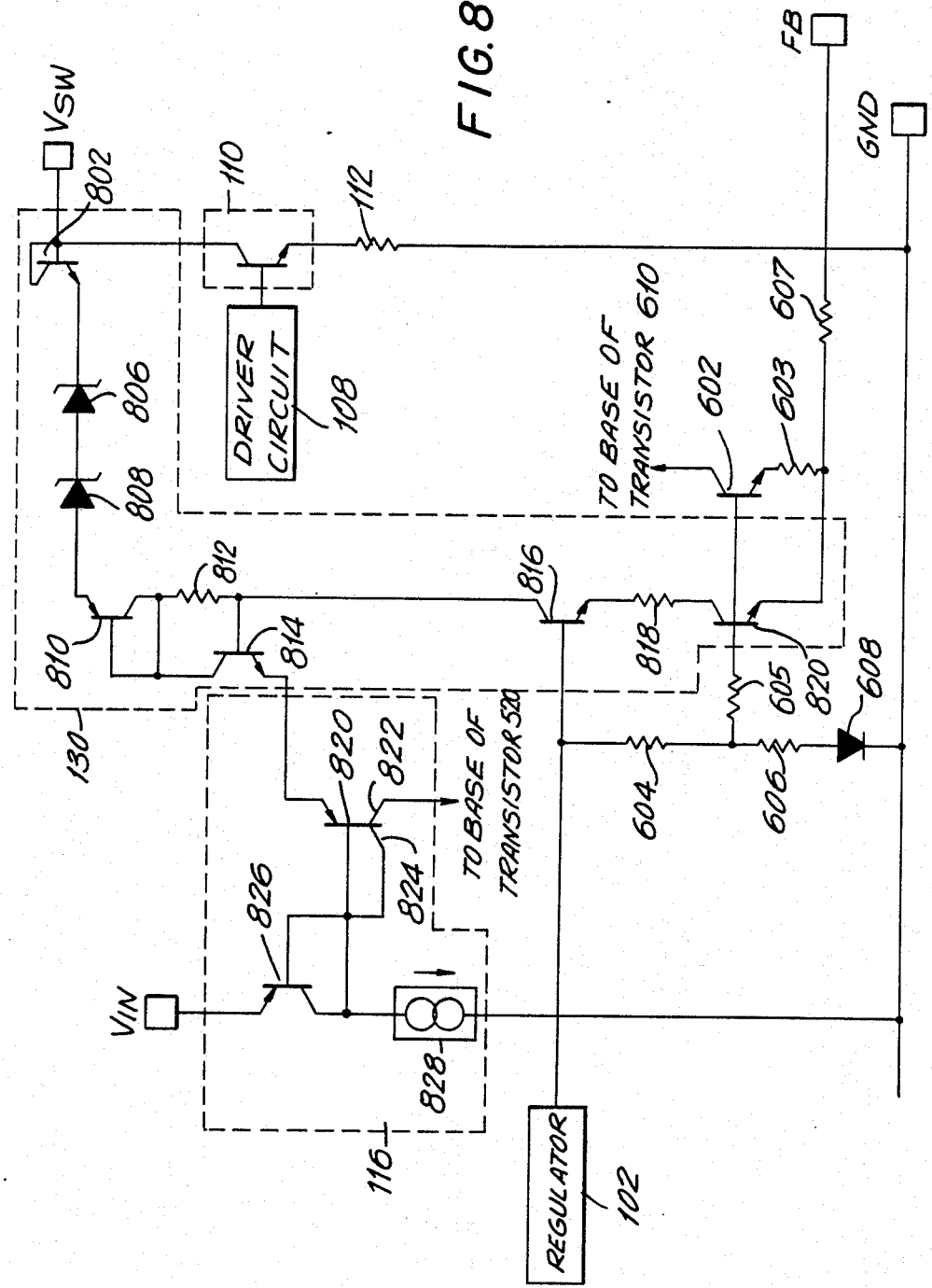

SWITCHING VOLTAGE REGULATOR CIRCUIT

This is a continuation of application Ser. No. 932,158, filed Nov. 18, 1986, entitled "SWITCHING VOLTAGE REGULATOR CIRCUIT", now abandoned.

BACKGROUND OF THE INVENTION

The present invention relates to an integrated circuit switching voltage regulator circuit having multi-function terminals. More particularly, the present invention relates to an integrated circuit for use in implementing a switching voltage regulator circuit, the integrated circuit requiring only five terminals, operable in both feedback and isolated flyback mode, and including a power switching element, a driver network, and control circuitry which sets the duty cycle of the switching element.

The function of a voltage regulator is to provide a predetermined and substantially constant output voltage level from an unregulated input voltage. Two types of voltage regulators are commonly used today: linear regulators and switching regulators.

A linear regulator controls output voltage by controlling the voltage drop across a power transistor which is connected in series with a load. The power transistor is operated in its linear region and conducts current continuously.

A switching regulator controls output voltage by using a power transistor as a switch to provide a pulsed flow of current to a network of inductive and capacitive energy storage elements which smooth the switched current pulses into a continuous and regulated output voltage. The power transistor is operated either in a cutoff or saturated state at a duty cycle required by the voltage differential between the input and output voltages. Varying the duty cycle varies the regulated output voltage of the switching regulator.

The duty cycle of a switching regulator is controlled by monitoring output voltage or current through the switch. The latter type of switching regulator is known as a current-mode switching regulator, and is easier to frequency stabilize and has better response to transients than does a switching regulator in which the duty cycle is controlled directly by output voltage.

Switching regulators have at least two advantages over linear regulators. First, switching regulators typically operate with greater efficiency than linear regulators, a particularly important factor in high current regulators. Second, switching regulators are more versatile than linear regulators. Switching regulators can provide output voltages which are less than, greater than, or of opposite polarity to the input voltage, depending on the mode of operation of the switching regulator, whereas linear regulators can only provide output voltages which are less than the input voltage.

Further, switching regulators can be configured to drive current through the primary winding of a transformer, the secondary winding of which simultaneously provides current to the load. The transformer provides current gain, the amount of which is determined by the turns ratio of the transformer. Multiple outputs are possible, each output typically requiring two steering diodes, an inductor and a capacitor. Alternatively, the transformer may be configured such that current provided to the primary winding of the transformer by the regulator switch is stored as energy in the primary winding and is transferred to the secondary winding only after the switch driving the primary winding is opened. This configuration, known as flyback operation, allows multiple regulated output voltages and requires only one steering diode and one capacitor for each output.

In either of the above transformer configurations, the isolation provided by the transformer between input and output circuits is limited by the need to regulate the output voltage by sensing the output voltage of the regulator circuit and providing a feedback voltage signal to the control circuitry of the circuit. The output circuit driven by the secondary winding of the transformer thus remains electrically connected to the input circuit driving the primary winding. Voltage regulator configurations which sense output voltage of the circuit for use as a feedback signal are referred to herein as normal feedback mode regulators. Another configuration, known as an isolated flyback mode regulator, allows a transformer secondary winding to be totally isolated from the input circuit connected to the primary winding by regulating the peak voltage developed across the primary winding when the secondary winding provides current to the output circuit.

Switching regulators, although more flexible than linear regulators in circuit applications, are typically more complex than linear regulators. Although several integrated circuits in the past have been commercially available for implementing the control, driver and power switch functions of switching regulators, switching regulators utilizing such integrated circuits have required substantial engineering expertise and numerous discrete components to make them operational. Also, integrated circuits heretofore available typically required 8–14 terminals for connection to external discrete components, and could not be configured into a very low current (shutdown) mode. This quantity of terminals prevented such integrated circuits from being packaged in low-cost power transistor packages such as the conventional 5-pin TO-3 type metal can or the TO-220 type molded plastic packages, and thus limited the power handling capability of the integrated circuit. Further, heretofore available integrated circuits for use in implementing switching voltage regulators have not been capable of use both in normal feedback mode switching regulator circuits and isolated flyback mode regulator circuits.

In view of the foregoing, it would be desirable to be able to provide a switching voltage regulator circuit which is simple to implement and which is capable of versatile and efficient operation.

It would further be desirable to be able to provide a switching regulator circuit, having a very low current sleep mode which can be implemented as an integrated circuit which includes the power switch, and which can be packaged in a conventional TO-3 or TO-220 power transistor package.

It would also be desirable to be able to provide an integrated circuit which can be utilized to implement both normal feedback mode and isolated flyback mode regulator circuit topologies.

SUMMARY OF THE INVENTION

It is therefore an object of the present invention to provide an integrated circuit for use in implementing a switching voltage regulator circuit, the integrated circuit being simple to implement and capable of efficient operation in numerous switching regulator configurations.

It is a further object of the present invention to provide an integrated circuit capable of implementing a switching voltage regulator circuit, and capable of operating in both normal feedback mode and isolated flyback mode voltage regulator configurations.

It is yet a further object of the present invention to provide an integrated circuit, for use in implementing a switching regulator, which includes control circuitry, driver circuitry and the power switch, which can be packaged in conventional 5-pin TO-3 or TO-220 power packages, and which is capable of operating in a very low current sleep mode.

These and other objects of the present invention are accomplished by a novel switching regulator circuit which can be packaged as an integrated circuit requiring only five external terminals for connection to discrete external components. The low number of terminals is achieved by assigning several functions to individual terminals. One terminal is used for soft starting, frequency compensation, switch current limiting and shutdown. Another terminal is used to receive a feedback signal when the integrated circuit is operated in a normal feedback mode switching voltage regulator circuit, and alternatively to place the integrated circuit into an isolated flyback mode and to vary the flyback reference voltage in an isolated flyback voltage regulator circuit.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 7 is a schematic diagram of a preferred embodiment of comparator 116 of the switching voltage regulator integrated circuit of FIG. 1; and FIG. 8 is a schematic diagram of a preferred embodiment of variable zener diode 130 of the switching voltage regulator of FIG. 1.

DETAILED DESCRIPTION OF THE INVENTION

Figure 1:
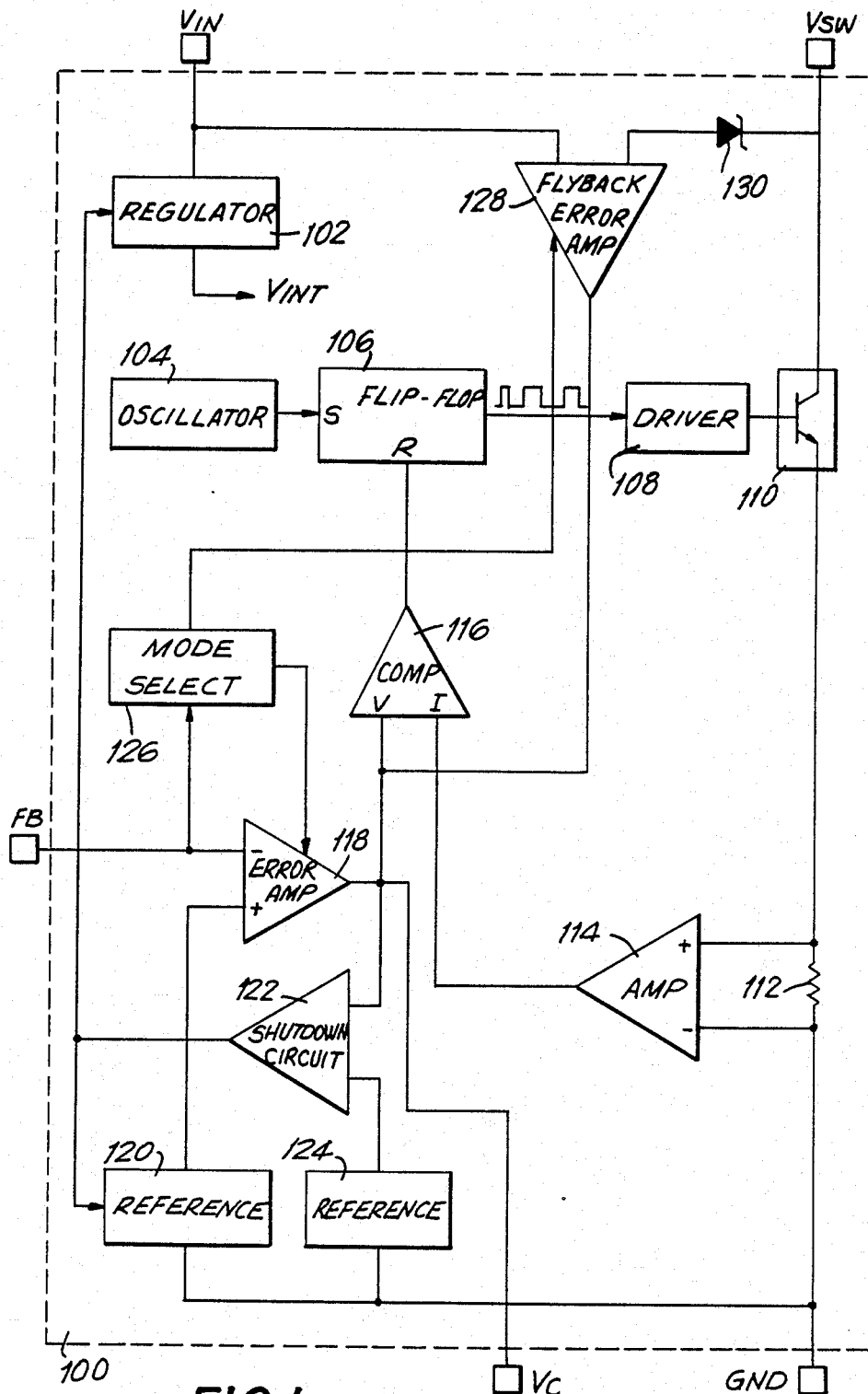
FIG. 1 is a block diagram of a five-terminal current-mode switching voltage regulator integrated circuit of the present invention.

FIG. 1 shows a five-terminal integrated circuit 100 of the present invention capable of implementing a current-mode switching voltage regulator circuit, and capable of being packaged in a conventional 5-pin power package. Five terminals are shown, labeled as $V_{IN}$ (input supply), $V_{SW}$ (output), FB (feedback), $V_C$ (compensation) and GND (ground).

Terminal $V_{IN}$ provides a connecting point for input voltage, and is used to supply power to the internal circuitry of integrated circuit 100. Terminal $V_{SW}$ is the output terminal of circuit 100. It provides a connecting point between power switch 110 of regulator 100 and external components configured to implement a number of switching regulator topologies, to convert the pulsed current flowing through switch 110 into a regulated output voltage. Further, when regulator 100 is operated in an isolated flyback mode, as discussed further herein, terminal $V_{SW}$ provides a flyback reference voltage point which is held to a peak voltage level which exceeds the voltage at terminal $V_{IN}$ by a predetermined amount.

Terminal FB provides three functions. First it serves as an input for feedback voltage when integrated circuit 100 is operated in a feedback mode. Second, terminal FB acts as a logic pin for programming integrated circuit 100 for normal feedback or isolated flyback operation. As further discussed below, integrated circuit 100 is converted from normal feedback operation to isolated flyback operation when a current exceeding a predetermined threshold level is conducted out of terminal FB by connecting terminal FB to ground through a resistor. Third, terminal FB is used to establish the relative value (to voltage at $V_{IN}$) of the flyback reference voltage at terminal $V_{SW}$. The different functions of terminal FB, and their implementation, are discussed in greater detail below.

Terminal $V_C$ provides access to a point in the internal circuitry of integrated circuit 100 to provide several functions. First, a frequency compensation circuit may be connected to terminal $V_C$ to control the closed loop response of integrated circuit 100. Second, a current limit circuit may be connected to terminal $V_C$ to limit the peak current through switch 110. Third, a soft-start circuit may be connected to terminal $V_C$ to ensure that the width of the initial current pulse flowing through switch 110 starts from zero and builds up to a proper level gradually when regulator 100 is first powered up, thereby avoiding sudden current surges upon start-up of the circuitry. Fourth, a shutdown circuit may be connected to terminal $V_C$ for placing regulator 100 into an inactive sleep mode in which the current drawn by regulator 110 is reduced to a very low value. These different functions, and their implementation, are described in greater detail below.

Referring now to the circuitry internal to switching regulator circuit 100, connected to terminal $V_{IN}$ is a linear voltage regulator 102 which regulates the supply voltage applied to terminal $V_{IN}$ to provide a substantially constant voltage for use by the internal circuitry of regulator 100. Voltage regulator 102 may be substantially any conventional voltage regulator circuit which provides a regulated output voltage of about 2.3V (this voltage is not critical, and may be varied as desired). Voltage regulator 102 is discussed in more detail below.

Conventional oscillator 104 is connected to the set input of conventional set/reset flip-flop 106 to provide flip-flop 106 with a digital clocking signal. The output of flip-flop 106 is connected to driver circuitry 108, which in turn is connected to switch 110. Substantially any conventional driver circuitry may be used to provide sufficient base drive current to switch transistor 110. Alternatively, a driver circuit may be used of the type disclosed in co-pending patent application Ser. No. 932,014 filed Nov. 18, 1986, entitled "Adaptive Transistor Drive Circuit", filed in the name of Carl T. Nelson, the disclosure of which is incorporated herein by reference.

The digital clocking signal provided by oscillator 104, which preferably has a frequency of approximately 40 kHz, is used to turn on switch 110 via flip-flop 106 and driver circuitry 108. Switch 110 is a power transistor having a base connected to driver circuitry 108, a collector connected to terminal $V_{SW}$ and an emitter connected to one end of sense resistor 112, the other end of which is connected to terminal GND.

Flip-flop 106 supplies a signal to driver circuitry 108 in response to the clock signal provided by oscillator 104. The signal provided by flip-flop 106 in response to the clock signal causes driver circuitry 108 to turn on switch 110. When regulator 100 is configured in a switching regulator with external components as described below, the current flows between terminal $V_{SW}$ and terminal GND as a consequence of the turning on of switch 110 and through sense resistor 112, which causes a voltage to be generated across sense resistor 112. Sense resistor 112 in FIG. 1 has a value of approximately 0.02 ohms, although other values may be used. The inputs of a conventional common base differential amplifier 114, preferably having a differential voltage gain of approximately 6, are connected across sense resistor 112. The output of amplifier 114 is connected to one input (I) of comparator circuit 116 (the details of which are further discussed with reference to FIG. 7). Amplifier 114 detects the voltage generated across sense resistor 112 when power transistor 110 conducts, and responsively provides an amplified signal to input I of comparator 116. The second input (V) of comparator 116 is connected to the output of an error amplifier 118 (the details of which also are discussed below with reference to FIG. 5). The inverting input of error amplifier 118 is connected to terminal FB. The noninverting input of error amplifier 118 is connected to an internal reference voltage generator 120. Reference voltage generator 120 is a temperature compensated band-gap reference voltage circuit (e.g., a Brokaw Cell) having a voltage output of approximately 1.24V. Error amplifier 118 has a differential voltage gain of approximately 800–1000, and provides a maximum output voltage of approximately 2.0V.

Error amplifier 118 detects the difference in voltage between the voltage at terminal FB and the reference voltage provided by reference generator 120, and responsively provides an error signal to the V input of comparator 116. The output of error amplifier 118 is also connected to terminal $V_C$ and to one input of shutdown circuit 122, a second input of which is connected to reference voltage generator 124. Reference voltage generator 124, the details of which are further discussed herein, preferably provides a reference voltage of approximately 0.15V. The output of shutdown circuit 122 is connected to regulator 102 and reference voltage generator 120. As will be explained in greater detail below with reference to FIG. 4, shutdown circuit 122 provides a shutdown signal to regulator 102 and reference generator 120 when the voltage at terminal $V_C$ is externally pulled down below the 0.15V reference voltage provided by reference generator 124.

The on/off duty cycle of switch 110 is determined by the output of comparator 116, which is connected to the reset input of flip-flop 106. The output state of comparator 116 at any time depends on the instantaneous values of the voltages at its two inputs. When integrated circuit 100 is operated in its normal feedback mode, as described below, a voltage proportional to the regulated output voltage is applied to terminal FB. Typically the voltage applied to terminal FB is set by a voltage divider resistor network comprising two resistors connected in series between the regulated output of the voltage regulator circuit and ground. Terminal FB is connected between the two resistors, and the ratio of the resistance values of the two resistors determines the proportional relationship of the feedback voltage applied to terminal FB to the regulated output voltage. The ratio is chosen such that the voltage applied to terminal FB equals the output voltage of reference generator 120 when the regulated output voltage is at a desired value. Error amplifier 118 produces a voltage output which changes in proportion to any difference in voltage between the voltage at terminal FB and the reference voltage provided by reference generator 120. If the voltage at terminal FB exceeds the reference voltage, the output voltage of error amplifier 118 drops proportionally, and if the voltage at terminal FB falls below the reference voltage, the output voltage of error amplifier 118 increases proportionally.

This voltage output is applied to input V of comparator 116. The voltage output of amplifier 114, which is proportional in magnitude to the current through switch 110, is applied to input I of comparator 116. As long as the voltage at input V remains higher than the voltage at input I, comparator 116 remains in an output state which causes flip-flop 106 to remain set and to thereby maintain the on condition of switch 110 which was initiated by oscillator 104. On the other hand, if the voltage at input V becomes lower than the voltage at input I, comparator 116 changes its output state to cause flip-flop 106 to reset, thereby causing driver circuitry 108 to turn off switch 110.

During normal feedback operation, therefore, switch 110 is turned off when switch current reaches a predetermined level set by the output of error amplifier 118. If the regulated output voltage rises above a predetermined steady-state value set by the voltage divider network and reference voltage generator 120, the duty cycle of switch 110 is shortened, because the voltage at input V drops as a result of the voltage differential at the inputs of error amplifier 118. The voltage at input I reflecting the switch current crosses the lowered threshold value set by the voltage at input V earlier in the switch cycle than during steady-state operation. The shortened duty cycle causes the regulated output voltage to drop until it reaches its previous steadystate value. If the regulated voltage falls below the predetermined steady-state value, the duty cycle of switch 110 is lengthened because error amplifier 118 causes the voltage at input V to increase above its steady-state value such that the voltage at input I crosses the threshold value set by the voltage at input V later in the switch cycle than during steady-state operation. The lengthened duty cycle causes the regulated output voltage to increase until it reaches its previous steady-state value.

The voltage $V_c$ at input V of comparator 116 varies between 0.9 and 2.0 volts during normal feedback operation. For a voltage at input V below 0.9V, the duty cycle of switch 110 is zero. Above 0.9V, and up to 2.0V, switch 110 closes (turns on) at the beginning of each cycle of oscillator 104 and opens (turns off) when the switch current (collector current through transistor 110) reaches a trip level set by the voltage at input V of comparator 116. The switch current trip level increases from zero, when input V is at a voltage approximately equal to 0.9V, to approximately 9.0A when the voltage at input V reaches its maximum value of 2.0V. Because this voltage appears at terminal $V_c$, the peak current through switch 110 can be limited by externally clamping the voltage of terminal $V_c$ to a set value below the internal clamp value of 2.0V. External current limiting is but one of several functions of terminal $V_C$. Other possible functions include frequency compensation, soft starting, and total regulator shutdown into a micropower sleep mode. The implementation of these functions will be further discussed below.

Terminal FB also serves multiple purposes. During normal feedback operation of integrated circuit 100, terminal FB acts as the input point for feedback voltage from the voltage regulator output, as previously discussed. Terminal FB further acts as a logic pin for programming regulator 100 for feedback or fully-isolated flyback operation. Terminal FB is connected to the input of mode select circuitry 126. Mode select circuitry 126 has an output connected to error amplifier 118 and to flyback error amplifier 128. Flyback error amplifier 128 has two inputs, one connected to terminal $V_{IN}$, and the other connected to the anode of a variable zener diode 130. The cathode of variable zener diode 130 is connected to terminal $V_{SW}$. The output of flyback error amplifier 128 is connected to the V input of comparator 116.

By connecting terminal FB to ground through an external resistor, current having a value determined by the resistance value of the external resistor is drawn out of terminal FB. As a result of the flow of this current, mode select circuitry 126 disables error amplifier 118 to effectively remove it from the circuit, and enables flyback error amplifier 128 to effectively connect its output to the V input of comparator 116, thereby placing regulator 100 into its isolated flyback mode of operation. A preferred embodiment of mode select circuitry 126 is discussed below.

In an isolated flyback regulator circuit, discussed in more detail below with reference to FIG. 3, terminal $V_{SW}$ is connected to one end of the primary winding of a transformer, the other end of which is connected to terminal $V_{IN}$. When switch 110 is closed, current is drawn through the inductive primary winding of the transformer and energy is stored. This energy is transferred to the secondary winding when switch 110 opens. Upon the opening of switch 110, a voltage is developed across the primary winding of the transformer which is proportionally related to the output voltage of the circuit by the turns ratio of the transformer (ignoring the offset in output voltage introduced by the forward-voltage drop of steering diodes connected between the secondary winding and the output of the circuit).

Flyback error amplifier 128 regulates the voltage differential developed when switch 110 is opened between terminals $V_{IN}$ and $V_{SW}$, and consequently that developed across the primary winding of the transformer, to a value equal to the breakdown voltage of variable zener diode 130.

On each switch cycle, if the voltage at terminal $V_{SW}$ rises to a value which exceeds the voltage at terminal $V_{IN}$ by more than the breakdown voltage of variable zener diode 130, a voltage differential is established at the inputs of flyback error amplifier 128 which causes the voltage output of flyback error amplifier 128 to decrease. This in turn lowers the switch current trip level voltage at input V of comparator 116. Consequently, the duty cycle of switch 110 is shortened in response to an increase in the voltage at terminal $V_{SW}$ above the reference voltage set by the voltage at terminal $V_{IN}$ and the breakdown voltage of variable zener diode 130. Conversely, if the voltage at terminal $V_{SW}$ does not reach a value equal to the sum of the voltage at terminal $V_{IN}$ and the breakdown voltage of variable zener diode 130, the voltage at the output of flyback error amplifier 128 increases, which in turn raises the switch current trip level voltage at input V of comparator 116. The duty cycle of switch 110 is thereby increased until the voltage at terminal $V_{SW}$ during the open condition of switch 110 exceeds the voltage at $V_{IN}$ by the breakdown voltage of variable zener diode 130. During the period when switch 110 is closed, the voltage at the output of flyback error amplifier 128 is held substantially constant by a resistance/capacitance network externally connected to terminal $V_C$, as described more fully below. In this manner, integrated circuit 100, when connected in an isolated flyback regulator circuit, maintains the peak voltage across the primary winding of a transformer connected between terminals $V_{IN}$ and $V_{SW}$ at the breakdown voltage of variable zener diode 138, and thereby regulates the output voltage of the isolated flyback regulator circuit.

Variable zener diode 130 has a minimum breakdown voltage of approximately 16V. The actual value of the breakdown voltage is dependent on the value of the external resistor connecting terminal FB to the ground, as will be further discussed below. Terminal FB thus provides a third function in that it permits the regulated flyback voltage to be trimmed by varying the value of the resistor connected thereto.

Figure 2:
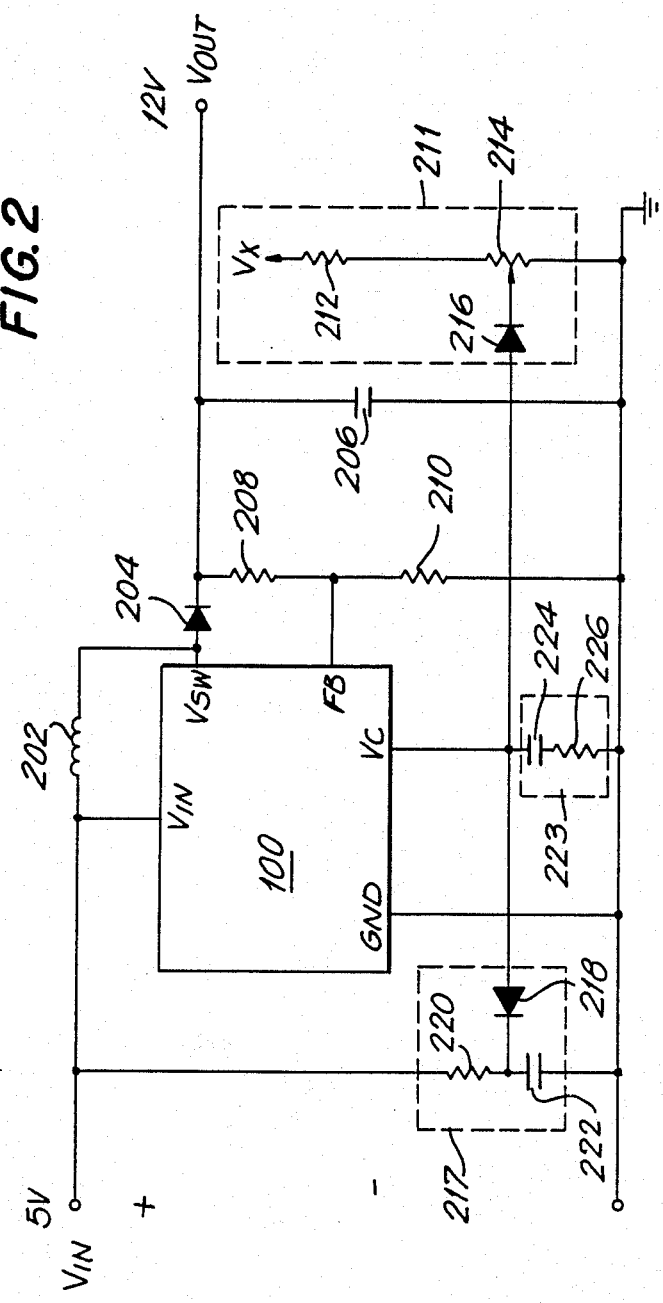
FIG. 2 is a schematic diagram of the switching voltage regulator integrated circuit of FIG. 1 connected in a normal feedback mode boost regulator configuration and including a soft-start circuit, a frequency compensation circuit, and an external current limiting circuit.
Figure 3:
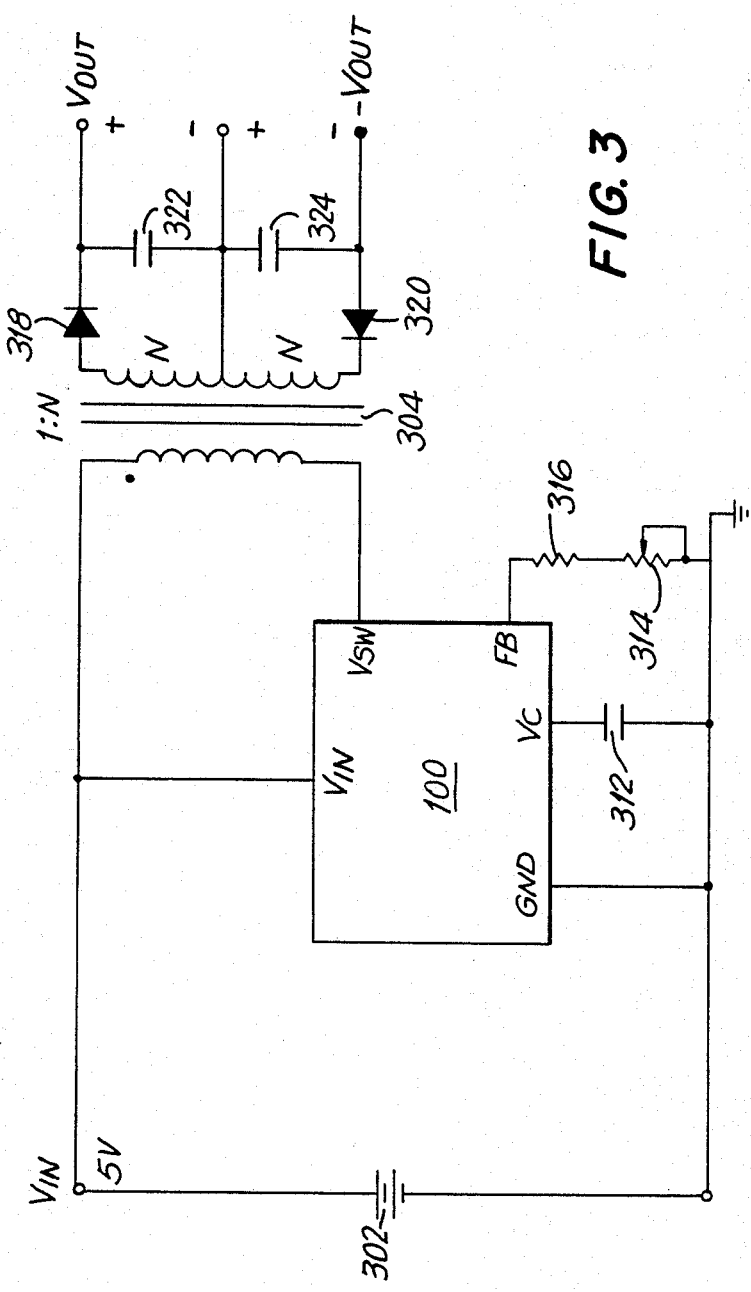
FIG. 3 is a schematic diagram of the switching voltage regulator integrated circuit of FIG. 1 connected in an isolated flyback mode switching regulator configuration.

FIGS. 2 and 3 show illustrative application circuits in which integrated circuit 100 is operated in its normal feedback mode (FIG. 2) and in its isolated flyback mode (FIG. 3).

Referring first to FIG. 2, a typical implementation of a boost regulator using integrated circuit 100 in its normal feedback mode and connected to discrete external components is shown. The boost regulator provides a regulated output voltage $V_{OUT}$ which is higher than the voltage applied at terminal $V_{IN}$.

Terminal $V_{IN}$ of integrated circuit 100 is connected to one end of inductor 202, the other end of which is connected to terminal $V_{SW}$ and to the anode of diode 204. The cathode of diode 204 is connected to one end of capacitor 206 and to one end of resistor 208. The other end of resistor 208 is connected to one end of resistor 210 and to terminal FB. The other end of resistor 210 is connected to ground, to the other end of capacitor 206, and to terminal GND.

The values of resistors 208 and 210 determine the regulated output voltage $V_{OUT}$. Error amplifier 118 operates in conjunction with comparator 116, as previously described with respect to FIG. 1, to cause the on/off duty cycle of switch 100 to adjust to that necessary to establish the voltage at terminal FB to equal the reference voltage out of reference generator 120. Resistors 208 and 210 comprise a voltage divider circuit which sets output voltage $V_{OUT}$ equal to 1.24 (R1+R2)/R2, where R1 is the value of resistor 208 and R2 is the value of resistor 210. Resistor 210 is preferably given the value 1.24 k ohms to set the current through resistor 210 at 1 mA, but this value can vary from 300 ohms to 10 k ohms with negligible effect on regulator performance. The value of resistor 208 is then selected to set $V_{OUT}$ to a desired value. To produce an output voltage $V_{OUT}$ equal to 12V, for example, resistor 208 has a value of 10.7 k ohms. For an input voltage of 5V and a switching frequency of 40 k Hz, the value of inductor 202 is 150 µH. Capacitor 206 has a capacitance of approximately 1000 µF. to ensure an effective series resistance of less than 0.04 ohms, which in turn produces a low output voltage ripple. The foregoing values for the external components shown in FIG. 2 are provided for purposes of illustration, and not of limitation. Other values may be used if desired.

FIG. 2 further shows simplified circuits for implementing current limiting, soft starting, frequency compensation, and shutdown of integrated circuit 100 to a micro-power sleep mode. As discussed above, terminal $V_C$ may be used to provide external current limiting. The peak current through switch 110 can be externally limited to any value less than 9A by clamping terminal $V_C$ to a voltage less than 2V. A circuit 211 for externally limiting the peak current through switch 110, by clamping the voltage at terminal $V_C$ to a value less than 2.0 volts, is shown in FIG. 2. Current limit circuit 211 is connected to terminal $V_C$ of regulator 100 via diode 216. Voltage $V_x$ is provided by a separate regulated voltage or the unregulated input voltage. Resistor 212 is connected between voltage $V_x$ and one end of variable resistor 214, and is selected to drop approximately 2V across variable resistor 214. The value of variable resistor 214 is preferably kept to 500 ohms or less to maintain a sharp knee in the current limit curve, although a greater value of resistance may be used if desired. The current limit can be fixed by replacing variable resistor 214 with a fixed resistor. Diode 216, connected between variable resistor 214 and terminal $V_C$, prevents current from flowing into terminal $V_C$. Other external clamp circuits may be used to provide more precise current limiting.

Terminal $V_C$ also may be used to provide a soft start operation. This ensures that the switch current is near zero when supply voltage is first applied to terminal $V_{IN}$, and that the output current rises gradually with time until it reaches its final value. An implementation of a soft start circuit is shown in FIG. 2. Soft start circuit 217 includes diode 218, resistor 220 and capacitor 222. The anode of diode 218 is connected to terminal $V_C$ and its cathode is connected to one end of resistor 220 and to one end of capacitor 222. The other end of resistor 220 is connected to terminal $V_{IN}$, and the other end of capacitor 222 is connected to terminal GND. Soft start circuit 217 provides a time-dependent external current limit which prevents regulator 100 from drawing large input currents or from overshooting the desired output voltage. During startup the voltage at terminal $V_C$ is clamped by capacitor 222 to less than 0.9 volts and rises gradually when voltage is first applied to terminal $V_{IN}$ at a rate determined by the value of resistor 220 and capacitor 222, thereby gradually increasing the peak current allowed through switch 110. Resistor 220 also resets the soft start circuit by providing a current path to discharge capacitor 222 when the circuit is turned off. Other soft-start circuits may of course be used.

Terminal $V_C$ further provides a point for introducing frequency compensation into the negative feedback loop of the switching voltage regulator circuit. Like any control system incorporating negative feedback, switching voltage regulators need a frequency compensation network to ensure that loop gain drops below unity before excess loop phase shift exceeds 180°. Such compensation is important in feedback switching voltage regulators, because the inductive elements in such circuits insert a 90° phase shift and output capacitors add an additional 90° phase shift in the feedback loop. In integrated circuit 100, the use of the output of error amplifier 118 at terminal $V_C$ to sense current and to set a switch current trip level significantly reduces inductance-induced phase shift, thus permitting a simple pole-zero compensation scheme to ensure both loop stability and good transient response.

Frequency compensation is preferably performed with an RC network connected between terminals $V_C$ and GND, as shown by frequency compensation circuit 223 in FIG. 2. One end of capacitor 224 is connected to terminal $V_C$, and the other end of capacitor 224 is connected to one end of resistor 226. The other end of resistor 226 is connected to terminal GND. The values of capacitor 224 and resistor 226 are determined by applying a square-wave generator to the regulator output and monitoring the voltage at the output. Initially, the circuit should be overcompensated with a large capacitor 224, preferably having a capacitance of at least 2 µF, and a small resistor 226, preferably having a value of approximately 1 k ohm, to produce a waveform which is single-pole overdamped. The value of capacitor 224 is then reduced until the response becomes slightly underdamped, and the value of resistor 226 is increased to introduce a zero into the loop and to thereby improve damping. Preferably, the smallest value for capacitor 224 and the largest value for resistor 226 which result in no loop oscillations and rapid loop settling are chosen.

Terminal $V_C$ additionally functions to provide a means for reducing the current drawn by integrated circuit 100 when it is desired to deactivate the regulator. As previously discussed with reference to FIG. 1, this function is implemented in integrated circuit 100 by shutdown circuit 122 and reference voltage generator 124. When the voltage at terminal $V_C$ is externally clamped to a value less than the 0.15V reference voltage provided by generator 124, shutdown circuit 122 provides a signal to regulator 102 and to generator 120 which deactivates both so that the only current drawn by regulator 100 is a current of 50 µA-100 µA necessary to bias shutdown circuit 122. The voltage at terminal $V_C$ can be externally pulled below 0.15V to activate shutdown circuit 122, the details of which are discussed below, by connecting terminal $V_C$ to a conventional relay or saturated transistor (not shown in FIG. 2).

FIG. 3 shows a fully-isolated flyback regulator configuration employing integrated circuit 100 in its isolated flyback mode to provide output voltages of ±15V from an input voltage of 5V. Terminal $V_{IN}$ is connected to a 5V voltage source 302, and to one end of the primary winding of transformer 304, the other end of which is connected to terminal $V_{SW}$. Transformer 304 has a turns ratio N equal to 0.875, where N is the ratio of secondary winding turns to primary winding turns for each output of transformer 304. Terminal GND is connected to the negative side of voltage source 302, to one end of frequency compensation capacitor 312, and to one end of variable resistor 314. The other end of frequency compensation capacitor 312 is connected to terminal $V_c$, and the other end of variable resistor 314 is connected to one end of resistor 316, the other end of which is connected to terminal FB. Frequency compensation capacitor 312 has a value of 0.01 $\mu$F. Variable resistor 314 and resistor 316 have values of 5 K ohms and 400 ohms, respectively.

Integrated circuit 100 is converted from normal feedback mode to isolated flyback mode when the current drawn from terminal FB by resistors 314 and 316 exceeds approximately 10 $\mu$A at 25° C. Terminal FB has a voltage of approximately 0.4V when this current is drawn out of the terminal, although the actual voltage depends on the value of resistors 314 and 316 because terminal FB has an output impedance of approximately 200 ohms. For example, a current of 400 $\mu$A in resistors 314 and 316 will reduce the voltage at terminal FB from 0.4V to 0.3V.

Resistors 314 and 316 also serve to adjust the regulated output voltage $V_{OUT}$. Regulator 100 regulates the voltage ($V_{PRI}$) across the primary of transformer 304 during the off time of switch 110 to $V_{PRI}=16V+7000(V_{FB}/R)$, where $V_{FB}$ is the voltage at terminal FB and R is the sum of the values of resistors 314 and 316. The regulated output voltage $V_{OUT}$ is determined by $V_{OUT}=N[16+7000\ (V_{FB}/R)]-V_f$, where $V_f$ is the forward voltage of diodes 318 and 320 connected to the secondary winding of transformer 304. Preferably, the term 7000 ($V_{FB}/R$) is set to approximately 2V to permit some adjustment range in $V_{OUT}$.

Connected between the cathode of diode 318 and a center tap of the secondary winding of transformer 304 is an output capacitor 322, and connected between the anode of diode 320 and the center tap is an output capacitor 324. The output capacitors 322 and 324 are responsible for filtering the output of the flyback regulator circuit because the flyback converter does not use the inductance of the transformer as a filter. Preferably, capacitors 322 and 324 have low effective series resistance to minimize output ripple. As this may require large capacitors, a conventional LC filter (not shown) also may be used at the output to provide low output ripple.

FIGS. 2 and 3 illustrate two applications of integrated circuit 100. They are provided only for illustration, and are not limitations of the present invention. Numerous other switching voltage regulator topologies may be implemented using integrated circuit 100. Further details concerning the application of integrated circuit 100 and such other topologies may be found in "LT1070 Design Manual, Application Note 19," dated June 1986, published by Linear Technology Corporation.

Figure 4:
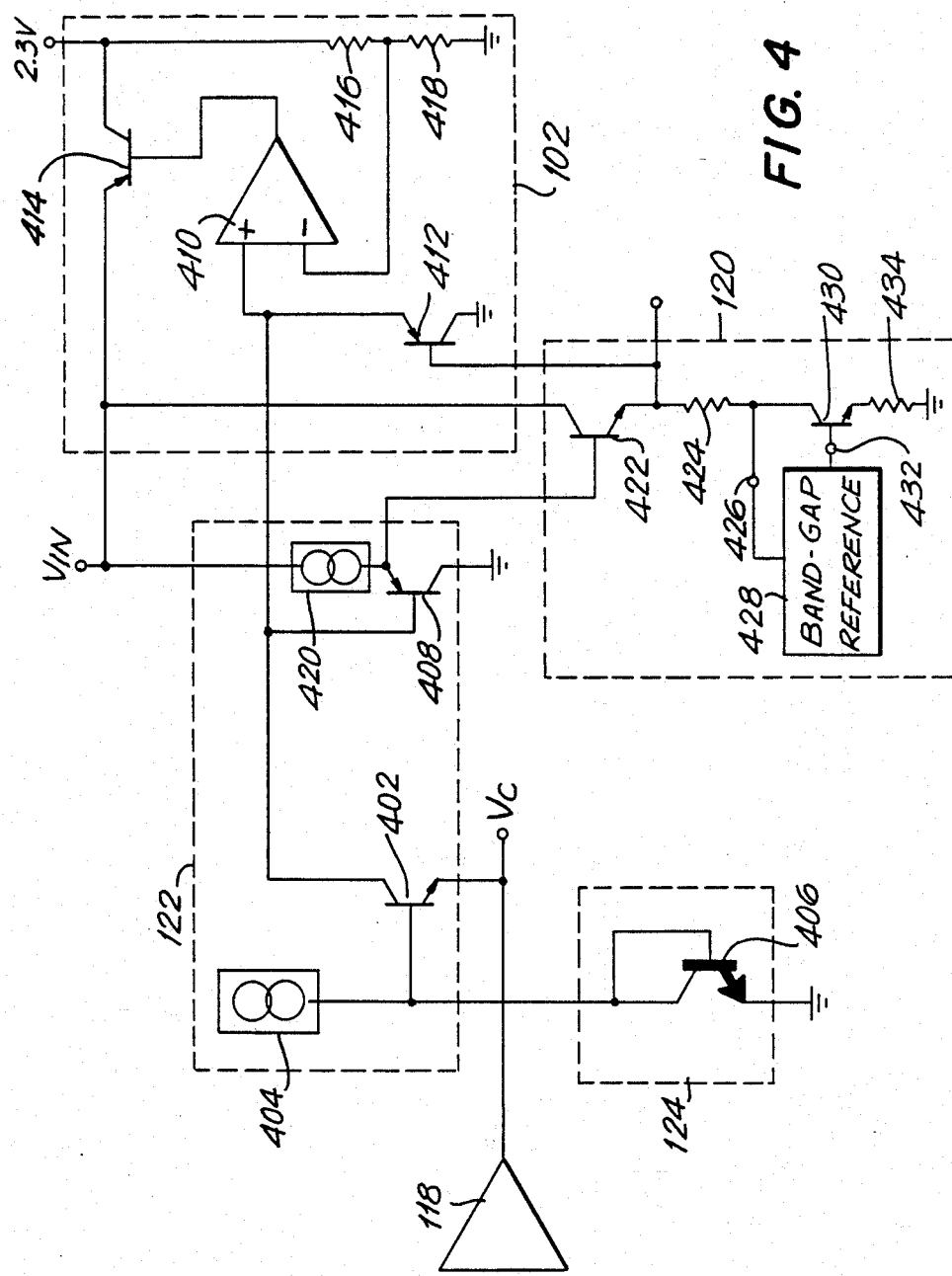
FIG. 4 is a schematic diagram of a preferred embodiment of shutdown circuit 122 and reference voltage generator 124, as well as reference 120 and regulator 102, of the switching voltage regulator integrated circuit of FIG. 1.

FIGS. 4-8 show preferred circuit embodiments for implementing components of integrated circuit 100 of FIG. 1. Referring first to FIG. 4, schematic diagrams are shown for shutdown circuit 122, regulator 102 and reference voltage generators 120 and 124. The output of error amplifier 118 is connected to terminal $V_C$ and to the emitter of transistor 402 of shutdown circuit 122. Connected to the base of transistor 402 is a conventional current source 404 and the base and collector of a transistor diode connected transistor 406. The emitter of transistor diode 406 is connected to ground. Transistor 406 is a high $V_{BE}$ transistor having a forward voltage which is approximately 0.15V greater than the forward base-emitter voltage of transistor 402. The collector of transistor 402 is connected to the base of transistor 408, to the non-inverting input of conventional differential error amplifier 410 of regulator 102 and to the emitter of transistor 412. The collector of transistor 412 is connected to ground and its base is connected to the output of reference voltage generator 120. Error amplifier 410, reference generator 120, and resistors 416 and 418 regulate the voltage drop across transistor 414 to provide a regulated output voltage of approximately 2.3V. Regulator 102 thus is configured as a conventional linear regulator having a reference voltage provided by reference voltage generator 120 and employing a PNP pass transistor to provide low drop-out, although regulator 102 may be any other conventional linear voltage regulator.

The emitter of transistor 408 is connected to conventional current source 420 and to the base of transistor 422 in reference voltage, generator 120. The emitter of transistor 422 is connected to one end of resistor 424, the other end of which is connected to the reference voltage output 426 of conventional Brokaw-cell bandgap voltage reference circuit 428, and to the collector of transistor 430. The base of transistor 430 is connected to a point 432 within band gap circuit 428 which has a positive temperature coefficient of approximately 2mV/° C., and to one end of resistor 434, the other end of which is connected to ground.

Band-gap reference circuit 428 provides a voltage of approximately 1.24V at reference output 426 having negative a temperature coefficient over at least a portion of the range of operating temperatures of integrated circuit 100 which causes the voltage at reference output 426 to decrease with increasing temperature. To increase the temperature stability of the output voltage of reference voltage generator 120, a voltage having a positive temperature coefficient is applied to the base of transistor 430. At a predetermined operating temperature, determined by the values of resistors 424 and 434, this voltage becomes sufficiently high to turn on transistor 430 and to thereby cause current to flow through resistors 424 and 434. The current flowing through resistor 424 causes a voltage drop across resistor 424 which increases the voltage at the output of reference voltage generator 120 over the output voltage of bandgap reference circuit 428. The voltage drop across resistor 424 has a positive temperature coefficient set by the values of resistors 424 and 434 which is used to offset the negative temperature coefficient of the output voltage of band-gap reference circuit 428. Resistors 424 and 434 have values of 200 ohms and 7.9 kilohms, respectively.

Current source 404 provides current to forward bias transistor diode 406. Because the forward voltage drop across transistor diode 406 is approximately 0.15V greater than the forward base-emitter voltage drop of transistor 402, transistor 402 remains in an off condition during normal operation of regulator 100 as the voltage at terminal $V_C$ varies between 0.9V and 2.0V. However, if the voltage at terminal $V_C$ is caused to drop below a value equal to the difference in the forward voltage of transistor diode 406 and the forward base-emitter voltage of transistor 402, which means that terminal $V_C$ is pulled down to a voltage level below 0.15V, the base-emitter junction of transistor 402 becomes forward biased and transistor 402 is turned on. The current drawn by transistor 402 pulls current out of the base of transistor 408, thereby causing the emitter of transistor 408 to draw current which turns off transistor 422. This disables reference voltage generator 120. Likewise, when transistor 402 conducts, the non-inverting input of error amplifier 410 is pulled low, thereby disabling regulator 102. In the micropower sleep shutdown mode, no current flows in integrated circuit 100 with the exception of the current necessary to bias transistors 402, 406 and 408. Typically, this current has a value in the range of 40 μA-100 μA.

Figure 5:
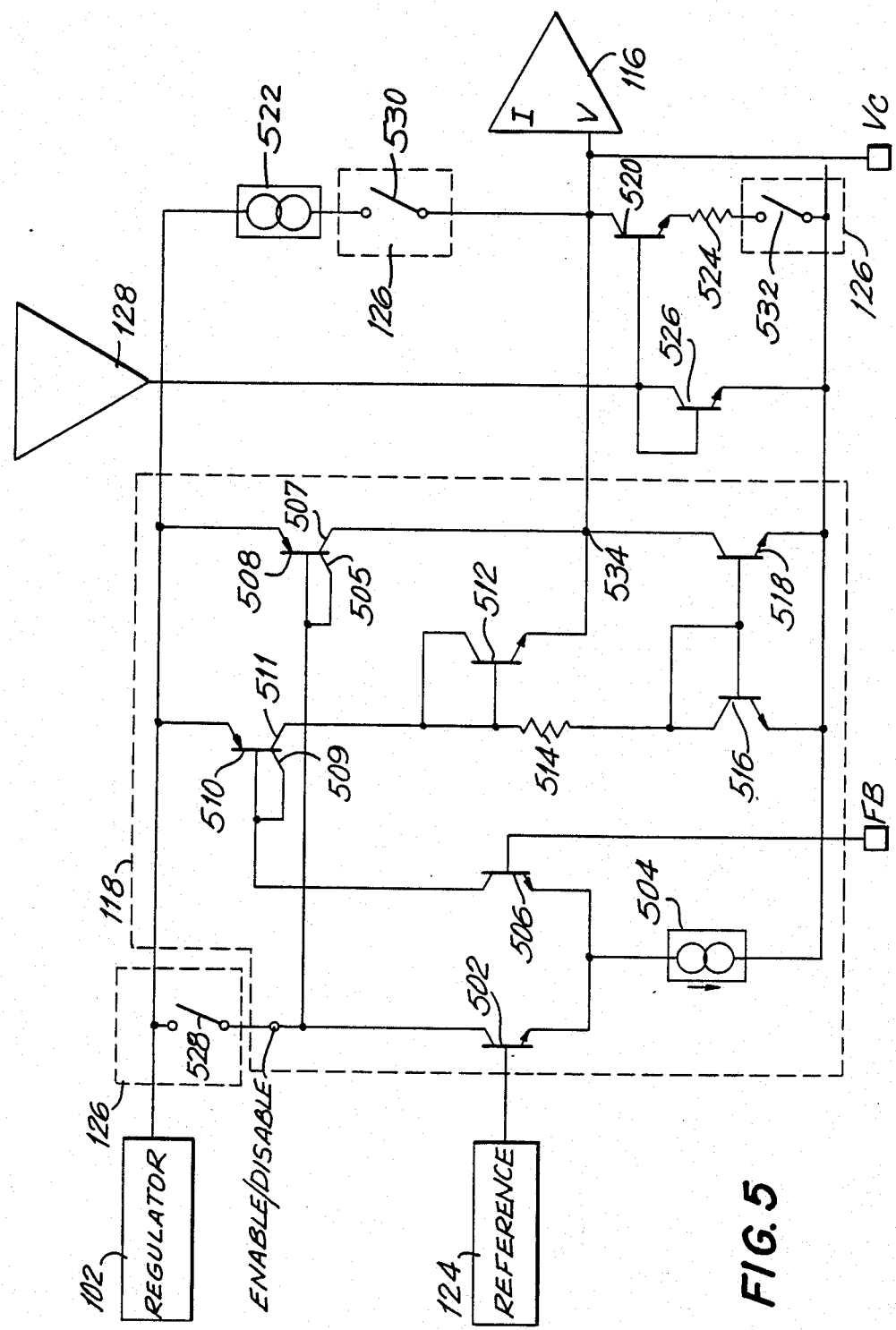
FIG. 5 is a schematic diagram of a preferred embodiment of error amplifier 118 and its interconnection with mode select circuit 126 of the switching voltage regulator integrated circuit of FIG. 1.

FIG. 5 shows a preferred implementation of mode select circuitry 126 and error amplifier 118 of FIG. 1. Reference voltage generator 124 is connected to the base of transistor 502 of error amplifier 118, and provides to the base a voltage of approximately 1.24V. The emitter of transistor 502 is connected to a conventional current source 504, and to the emitter of transistor 506, the base of which is connected to terminal FB.

The bases of transistors 502 and 506 act as the inputs of error amplifier 118. Current source 504 causes a current of approximately 50 μA to flow from the junction of the emitters of transistors 502 and 506. The collector of transistor 502 is connected at a node to one end of switch 528, and to the base and collector 505 of transistor 508. That node is labelled in FIG. 5 "enable/disable". The other end of switch 528 is connected to the output of regulator 102, as are the emitters of transistors 508 and 510. The collector of transistor 506 is connected to the base and collector 509 of transistor 510, collector 511 of which is connected to the base and collector of transistor 512 and to one end of resistor 514. The other end of resistor 514 is connected to the base and collector of transistor 516 and to the base of transistor 518. Collector 507 of transistor 508 and the collector of transistor 518 are connected to the emitter of transistor 512, the collector of transistor 520, one end of switch 530, and terminal $V_C$. The areas of collectors 507 and 511 are respectively four times greater than the areas of collectors 505 and 509.

Transistors 502 and 506 form a differential input stage. The collector currents are inverted and multiplied by a factor of four by transistors 508 and 510, the current gains of which are set by the collector area ratio. The collector current of transistor 508 is further inverted by transistors 516 and 518 to generate a current fed balanced output at node 534 which can swing from a maximum voltage of approximately 2.3V set by regulator 102, when the voltage at terminal FB is pulled low, to a clamp level of approximately 0.4V set by resistor 514 and transistor 512, when the voltage at terminal FB rises above the voltage applied to the base of transistor 502 by generator 124. Resistor 514 has a value of approximately 3 k ohms although other values may be used to set different clamp levels.

The other end of switch 530 is connected to conventional current source 522, which provides a current of approximately 30 μA. The emitter of transistor 520 is connected to one end of resistor 524, the other end of which is connected to one end of switch 532. The other end of switch 532 is connected to the emitters of transistor diode 526 and transistors 516 and 518, and to current source 504. The collector and base of transistor diode 526 are connected to the output of flyback error amplifier 128.

During the normal feedback mode of operation of integrated circuit 100, switches 528, 530 and 532 are open and a feedback voltage is applied to terminal FB. Error amplifier 118 is enabled while switch 528 is open, and an output voltage therefrom is applied to the V input of comparator 116. At the same time, the output voltage of flyback error amplifier 128 is applied to the base of transistor 520. However, because switches 530 and 532 are open, the output of flyback error amplifier 128 is isolated from terminal $V_C$ during feedback operation of integrated circuit 100 and effectively disabled.

In the isolated flyback mode of integrated circuit 100, terminal FB is pulled low by an external resistor connected to ground and switch 528 is closed, thus turning off transistor 507 and disabling error amplifier 118. Switches 530 and 532 are closed only after a delay of 1.5 microseconds, as discussed below, following the closing of switch 110. This prevents the flyback error amplifier 128 from attempting to regulate the voltage at terminal $V_{SW}$ during any overvoltage spikes caused by the leakage inductance of the transformer in the flyback regulator circuit. When switches 530 and 532 are closed, the output of flyback amplifier 128 drives transistor 520, which in turn controls the voltage at terminal $V_C$. The current through switch 530 is fixed at 30 μA by current source 522. The current through switch 532 can rise to a maximum of approximately 70 μA, allowing terminal $V_C$ to source current up to 30 μA, or to sink current up to 40 μA, in the flyback mode. The gm of flyback error amplifier 128 is typically 300 micromhos. Current source 504 sets the gm of error amplifier 118 at 4400 micromhos.

Figure 6:
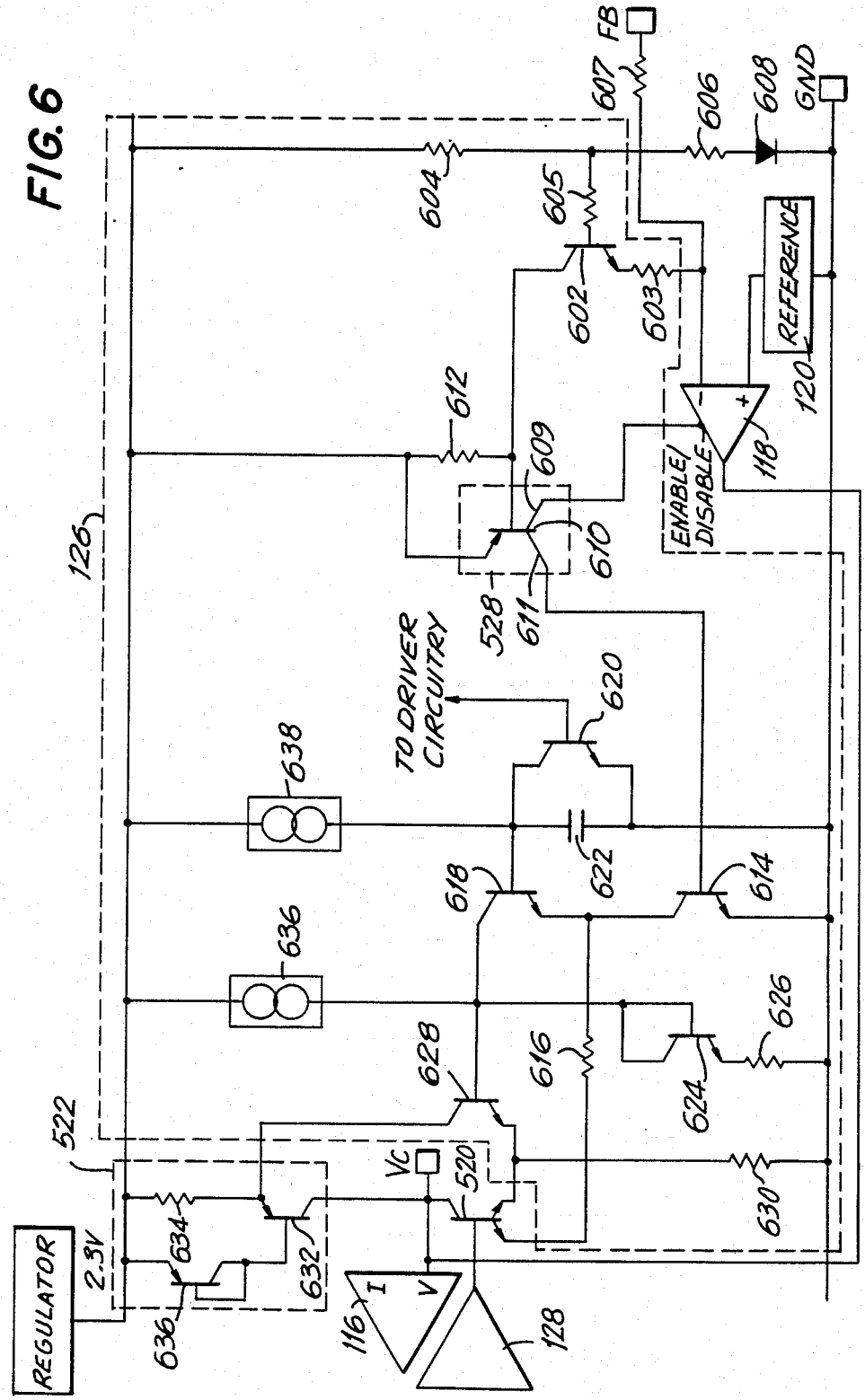
FIG. 6 is a schematic diagram of a preferred embodiment of switches 528, 530 and 532 and mode select circuit 126 of FIGS. 1 and 5.

Switches 528, 530 and 532, and mode select circuitry 126, are shown in FIG. 6 in greater detail. The emitter of transistor 602 is connected to one end of resistor 603, the other end of which is connected to the inverting input of error amplifier 118. The other end of resistor 607 is connected to terminal FB. Resistor 603 has a value of 5 kohms, resistor 605 a value of 1.3 kohms, and resistor 607 a value of 30 ohms. The non-inverting input of error amplifier 118 is connected to the output of reference voltage generator 120 and is provided thereby with a reference voltage of approximately 1.24V. The base of transistor 602 is connected to one end of resistor 605, the other end of which is connected between resistors 604 and 606. The other end of resistor 604 is connected to the output of regulator 102 (hereinafter referred to as the 2.3V line). The other end of resistor 606 is connected through diode 608 to terminal GND. The collector of transistor 602 is connected to the base of transistor 610 and to one end of resistor 612, the other end of which is connected to the 2.3V line and to the emitter of transistor 610. Collector 609 of transistor 610 is connected to the collector of transistor 502, shown in FIG. 5, and collector 611 of transistor 610 is connected to the base of transistor 614.

The emitter of transistor 614 is connected to terminal GND, and its collector is connected to one end of resistor 616, the other end of which is connected to one emitter of transistor 520, and to the emitter of transistor 618. Resistor 616 has a value of approximately 24 kilohms. The base of transistor 618 is connected to current source 638, to the collector of transistor 620 and to one end of capacitor 622, the other end of which is connected to the emitter of transistor 620. Current source 638 provides a current of approximately 20 μA. The base of transistor 620 is connected to driver circuitry 108 and is turned on and off by driver circuitry 108 in phase with the turning on and off of power switch transistor 110. The collector of transistor 618 is connected to current source 636, to the base and collector of transistor diode 624, the emitter of which is connected to terminal GND through resistor 626, and to the base of transistor 628. Current source 636 provides a current of approximately 100 μA. The emitter of transistor 628 is connected to an emitter of transistor 520, and to terminal GND through resistor 630, which has a value of 1.0 kilohms. The collector of transistor 628 is connected to the emitter of transistor 632, and to the 2.3V line through resistor 634, which has a value of approximately 1.3 kilohms. The collector of transistor 632 is connected to the collector of transistor 520, to the V input of comparator 115 and to terminal $V_C$. The base of transistor 632 is connected to the base and collector of transistor diode 636, the emitter of which is connected to the 2.3V line. Transistors 632 and 636, and resistor 634, correspond to current source 522 of FIG. 5, and provide a 30 μA current to the collector of transistor 520.

The base of transistor 520 is connected to the output of flyback error amplifier 128 and to the base and collector of transistor diode 526, the emitter of which is connected to terminal GND as shown in FIG. 5.

Resistors 604 and 606, which have values of approximately 5.8 kilohms and 500 ohms, respectively, and diode 608 bias the base of transistor 602 at a voltage of approximately 1V. When an external resistor is connected between terminal FB and ground, such that current is drawn out of terminal FB, the voltage at terminal FB is clamped to approximately 0.4V by transistor 602. The current drawn through transistor 602 causes transistor 610 to turn on, thereby providing current to the collector of transistor 502 (shown in FIG. 5) and the base of transistor 614. In this manner, transistor 610 acts as switch 528 in FIG. 5, disabling error amplifier 118 as before described when an external resistor is connected between terminal FB and ground.

Driver circuitry 108 provides a drive current to the base of transistor 620 when switch 110 is closed which forward biases transistor 620 into saturation. The current drawn by transistor 620 holds transistor 618 in an off condition, which in turn allows transistor 628 to conduct. The on condition of transistor 628 pulls the emitter of transistor 632 low, turning off transistor 632. Transistor 628 acts as switch 530, disabling current source 522 while switch 110 is closed. The on condition of transistor 628 also holds the emitter of transistor 520 at a sufficiently high voltage to maintain transistor 520 in an off condition, thereby isolating the output of flyback amplifier 128 from input V of comparator 116. In this manner, transistor 628 also acts as switch 532, preventing flyback error amplifier 128 from regulating the voltage at terminal $V_{SW}$ while switch 110 is closed.

Upon the opening of switch 110, driver circuitry 108 causes transistor 620 to turn off. Capacitor 622, which has a capacitance of 40 pF, is charged by the current from current source 638. After approximately 1.5 microseconds, the voltage across capacitor 622 causes transistor 618 to conduct, which in turn forces transistor 628 into an off condition. This permits transistors 520 and 632 to turn on and enables flyback error amplifier 128 to regulate the voltage at terminal $V_{SW}$. The 1.5 microsecond delay between the closing of switch 110 and the enabling of flyback amplifier 128 prevents overvoltage spikes from degrading the regulation of the flyback converter. While regulator 100 is in its flyback mode, and during the periods when flyback error amplifier 128 is disabled, the voltage at terminal $V_C$ is held to its previous value by the frequency compensation network connected to terminal $V_C$.

FIG. 7 shows a preferred embodiment for implementing comparator 116 of FIG. 1. Transistor 702 has a first collector 705 connected to the reset input of flip-flop 106 and to current source 704, and remote collector 706 which is connected to the base of transistor 702. Current source 704 provides a current of approximately 50 μA. The emitter of transistor 702 is connected to the output of amplifier 114 and to current source 708, which provides a current of approximately 330 μA. The base and remote collector 706 of transistor 702 are connected to the emitter of transistor 710, and to current source 712, which provides a current of approximately 50 μA. The collector of transistor 710 is connected to the output of regulator 102, which provides a voltage of approximately 2.3V. The base of transistor 710 is connected to terminal $V_C$ through resistor 714.

The voltage at the base of transistor 702 is approximately equal to the voltage at terminal $V_C$ minus the base-emitter voltage drop of transistor 710. When the voltage at terminal $V_C$ is higher than the voltage at the output of amplifier 114, the base-emitter junction of transistor 702 is reverse-biased, and the reset input of flip-flop 106 is held low by current source 704, maintaining flip-flop 106 in the set condition initiated by oscillator 104. When the voltage at terminal $V_C$ drops below the voltage at the output of amplifier 114, indicating that the current passing through switch 110 has reached the switch current trip level, transistor 702 turns on and activates the reset input of flip-flop 106, thereby causing switch 110 to open.

As transistor 702 saturates, collector 706 begins to conduct current. This prevents current source 712 from pulling the base of transistor 702 to ground, and thereby prevents the deactivation of the reset input of flip-flop 106 which might otherwise result from the saturation of transistor 702.

FIG. 8 shows a preferred embodiment of flyback error amplifier 128 and variable zener diode 130. Referring first to variable zener diode 130, terminal $V_{SW}$ is connected to the base and collector of transistor diode 802 of zener diode 130, and to the collector of power switch transistor 110. The base of power switch transistor 110 is connected to the output of driver circuitry 108, and its emitter is connected to one end of sense resistor 112, the other end of which is connected to terminal GND as before described. The emitter of transistor diode 802 is connected to the cathode of zener diode 806, the anode of which is connected to the cathode of zener diode 808. Zener diodes 806 and 808 each have a breakdown voltage of approximately 7.0V, although zener diodes having other values of breakdown voltage may be used, as will be appreciated. The anode of zener diode 808 is connected to the emitter of transistor diode 810, the collector and base of which are connected to one end of resistor 812 and to the collector of transistor 814. Resistor 812 has a value of approximately 7 kilohms.

Resistor 812 is also connected to the collector of transistor 816, the base of which is connected to the output of regulator 102, and the emitter of which is connected to one end of resistor 818. The other end of resistor 818, which preferably has a value of approximately 200 ohms, is connected to the collector of transistor 820, the base of which is connected to one end of resistor 605 and to the base of transistor 602 of mode select circuitry 126. The emitter of transistor 820 is connected to one end of resistor 603 and to one end of resistor 607. The connection of transistor 602, resistors 603, 604, 605, 606 and 607, and diode 608 is the same as discussed for the mode select circuit of FIG. 6.

The emitter of transistor 814 is connected to the emitter of transistor 820 of flyback amplifier 128. Collector 822 of transistor 820 of flyback amplifier 128 is connected to the base of transistor 520, shown in FIG. 5. Collector 824, which has an area approximately four times less than that of collector 822, and the base of transistor 820 are connected to the base and collector of transistor diode 826, and to current source 828, which provides a current of 75 $\mu$A to bias transistor 820. The emitter of transistor diode 826 is connected to terminal $V_{IN}$.

As discussed in connection with FIG. 6, integrated circuit 100 is placed into its flyback mode by pulling a threshold current ranging from 3 $\mu$A to 30 $\mu$A out of terminal FB. This current is drawn through the emitters of transistors 602 and 820, which conduct substantially equal amounts of current up to a value of approximately 1 $\mu$A, at which point resistor 603 begins to reduce the percentage of current conducted by transistor 602. Resistor 603 limits the maximum current conducted by transistor 602 to approximately 30 $\mu$A, forcing any additional current drawn out of terminal FB to be conducted by transistor 820. The current conducted by transistor 820 flows through resistor 812, creating a proportional voltage drop from the collector to the base of transistor 814. This voltage drop increases the effective breakdown voltage of variable zener diode 130, which is comprised by transistor diodes 802 and 810, zener diodes 806 and 808, and transistor 814. The effective breakdown voltage is determined by summing the voltage drops across the base-emitter junctions of transistor 814 and transistor diodes 802 and 810, the breakdown voltages of zener diodes 806 and 808, and the voltage across resistor 812, and is approximately equal to $16V + 7000 (V_{FB}/R)$, where 7000 is the value of resistor 812, $V_{FB}$ is the voltage at terminal FB, R is the value of the external resistor tying terminal FB to ground, and the term $7000 (V_{FB}/R)$ represents the voltage across resistor 812. The voltage at terminal FB is approximately 0.4V when a current of 30 $\mu$A is pulled out of terminal FB. Due to the output impedance of terminal FB, which is approximately 200 ohms, this voltage drops to approximately 0.3V when a current of 500 $\mu$A is pulled out of terminal FB. Neglecting the variation in voltage $V_{FB}$ due to output impedance, it can be seen that the effective breakdown voltage of variable zener diode 130 is dependent on the value of the resistor connected to terminal FB. For example, a 1.0 kohm resistor tied between terminal FB and ground results in an effective breakdown voltage of approximately 18.5V. Thus, the flyback reference voltage set by the effective breakdown voltage of variable zener diode 130 can be trimmed by varying the value R of the external resistor tying terminal FB to ground.

Current source 828, transistor diode 826 and transistor 820 comprise flyback error amplifier 128. When the voltage at terminal $V_{SW}$ exceeds the voltage at terminal $V_{IN}$ by more than the effective breakdown voltage of variable zener diode 130, zener diodes 806 and 808 conduct, causing transistor 820 to turn on. Transistor 820 provides current to the base of transistor 520 causing it to turn on and to pull down the voltage at the V input of comparator 116, thereby lowering the switch current trip level and shortening the duty cycle of switch 110. When the voltage at terminal $V_{SW}$ does not exceed the voltage at $V_{IN}$ by at least the effective breakdown voltage of variable zener diode 130, transistor 820 does not conduct, and transistor 520 is turned off. At the same time, current source 522, shown in FIG. 5, provides a current of approximately 30 $\mu$A to the V input of comparator 116 which causes the voltage at the V input to increase, thereby raising the switch current trip level and consequently lengthening the duty cycle of switch 110.

While preferred embodiments of the invention have been set forth for purposes of the disclosure, modification of the disclosed embodiments may occur to those of skill in the art. For example, while the multi-function terminal feature of the present invention has been disclosed in the context of an integrated circuit for use in implementing a current-mode switching voltage regulator, it will of course be understood by those of skill in the art that the invention may be employed to implement a 5-terminal integrated circuit for use with voltage-mode switching voltage regulator topologies having a micro-power sleep mode capability.

Thus, a switching voltage regulator circuit including control circuitry, driver circuitry and a power switching device, capable of being implemented as an integrated circuit requiring only five terminals having multiple functions, including micro-power mode shutdown circuitry, and operable in a normal feedback mode as well as in an isolated flyback mode, has been disclosed. The invention can readily be packaged in a 5-pin power transistor integrated circuit package. One skilled in the art will appreciate that the present invention can be practiced by other than the described embodiments, which are presented for purposes of illustration and not of limitation, and the present invention is limited only by the claims which follow.

What is claimed is:

1. An integrated circuit for use in a switching voltage regulator circuit, the switching voltage regulator circuit providing a regulated voltage output at an output terminal, the integrated circuit including internal drive circuitry, a power switching transistor and control circuitry for varying the switching duty cycle of the switching transistor, the integrated circuit having at most five terminals including an input terminal, an output terminal a ground terminal and first and second function terminals for connection to discrete external components to implement the switching voltage regulator circuit, the integrated circuit comprising:

first means connected to one of the function terminals for accepting a feedback signal from the output of the switching voltage regulator circuit and for enabling the integrated circuit to operate in a first mode to regulate the output of the switching voltage regulator by varying the duty cycle of the switching transistor as a function of the magnitude of the feedback signal;

second means connected to the input and output terminals for enabling the integrated circuit to operate in an isolated flyback mode to regulate the output of the switching voltage regulator circuit as a function of a feedback voltage developed across a primary winding of a discrete external transformer; and mode select means connected to one of the function terminals and to said first and second means to disable the first means and to enable the second means in response to a disable signal applied to that function terminal by the discrete components.

2. An integrated circuit for use in a switching voltage regulator circuit providing a regulated output voltage, the integrated circuit having internal drive circuitry, a power switching transistor and control circuitry for varying the on and off switching duty cycle of the switching transistor, and further having an input terminal, an output terminal, a ground terminal and first and second function terminals for connection to external components, the integrated circuit comprising:
first means connected to the first function terminal and to the control circuitry for accepting a first feedback signal indicative of the regulated output voltage, and for enabling the integrated circuit to operate in a normal feedback mode to regulate the regulated output voltage by varying the duty cycle of the switching transistor as a function of the magnitude of the first feedback signal;
second means connected to the input and output terminals and to the control circuitry for accepting a second feedback signal between the input and output terminals indicative of a voltage developed across a winding of an external transformer, and for enabling the integrated circuit to operate in a fully isolated flyback mode to regulate the regulated output voltage as a function of the magnitude of the second feedback signal; and
third means connected to one of the function terminals and to said first and second means to disable one of the first and second means and to enable the other in response to a control signal applied to that function terminal by external components.

3. The integrated circuit of claim 2, wherein said first means includes:
means for producing a first reference signal; and
means for detecting a difference between the first feedback signal and the first reference signal, and for generating an error signal indicative of that difference;
and wherein the control circuitry includes:
means for comparing the error signal to a signal indicative of the magnitude of current conducted by the switching transistor; and
means responsive to said comparing means for turning off the switching transistor when the current magnitude signal exceeds the error signal.

4. The integrated circuit of claim 2, wherein said second means includes:
means responsive to the second feedback signal for generating an error signal indicative of a difference between the second feedback signal and a predetermined threshold signal level;
and wherein the control circuitry includes:
means for comparing the error signal to a signal indicative of the magnitude of current conducted by the switching transistor, and
means responsive to said comparing means for turning off the switching transistor when the current magnitude signal exceeds the error signal.

5. The integrated circuit of claim 2, wherein said first means includes:
means for producing a first reference signal; and
means for detecting a difference between the first feedback signal and the first reference signal, and for generating a first error signal indicative of that difference;

wherein said second means includes:
means responsive to the second feedback signal for generating a second error signal indicative of a difference between the second feedback signal and a predetermined threshold signal level;
and wherein the control circuitry includes:
means for receiving the first and second error signals, for comparing at any given time one of the first and second error signals to a signal indicative of the magnitude of current conducted by the switching transistor; and
means responsive to said comparing means for turning off the switching transistor when the current magnitude signal exceeds the compared one of the first and second error signals.

6. The integrated circuit of claim 3, wherein said means for generating an error signal includes a differential amplifier having a first input for receiving the feedback signal and a second input for receiving the first reference signal.

7. The integrated circuit of claim 4, wherein said means for generating the second feedback error signal includes:
an amplifier having a first input connected to one of the input and output terminals; and
means connected to a second input of said amplifier and to the other of the input and output terminals for establishing a threshold voltage, whereby a voltage differential is established across the inputs of the amplifier when a voltage difference between the input and output terminals exceeds the threshold voltage.

8. The integrated circuit of claim 7, wherein said means for establishing a threshold voltage includes a zener diode.

9. The integrated circuit of claim 8, wherein said zener diode has a zener breakdown voltage, and wherein said means for establishing a threshold voltage further includes:
means for establishing a trimming voltage in series with the zener breakdown voltage such that at least a part of the threshold voltage is comprised of the sum of the trimming and zener breakdown voltages; and
means connected to said means for establishing a trimming voltage, and to one of the function terminals, for varying the trimming voltage in response to a signal at that function terminal, thereby varying the threshold voltage.

10. The integrated circuit of claim 9, wherein said means for varying the trimming voltage is connected to the first function terminal.

11. The integrated circuit of claim 10, wherein:
said means for establishing a trimming voltage comprises a resistor; and wherein
said means for varying the trimming voltage varies a current conducted by said trimming voltage resistor as a function of a current conducted by the first function terminal.

12. The integrated circuit of claim 11, wherein the current conducted by the first function terminal is established at least in part by external components connected to the first function terminal.

13. The integrated circuit of claim 12, wherein the external components connected to the first function terminal includes a resistor connected to ground.

14. The integrated circuit of claim 2, wherein said third means is connected to the first function terminal.

15. The integrated circuit of claim 14, wherein the control signal is a current, and wherein said third means includes:
    means for sensing the current conducted by the first function terminal; and
    means responsive to said sensing means for disabling said first means and enabling said second means when the current sensed by said sensing means exceeds a predetermined threshold current.

16. The integrated circuit of claim 2, wherein said third means is connected to the first function terminal, and wherein the integrated circuit further comprises:
    fourth means connected to the control circuitry and to the second function terminal for performing at least two of:
    (a) frequency compensating the integrated circuit,
    (b) limiting the peak current conducted by the switching transistor,
    (c) variably limiting the current conducted by the switching transistor as a function of time, and
    (d) shutting down the integrated circuit, whereby the current drawn by the integrated circuit is reduced.

17. The integrated circuit of claim 16, wherein said fourth means includes:
    means for generating a signal indicative of the magnitude of current conducted by the switching transistor;
    means connected to at least one terminal of the integrated circuit for sensing a feedback signal from the discrete components indicative of the magnitude of at least one of the regulated output voltage and the voltage developed across the winding of the external transformer, and for generating an error signal indicative of the difference between the feedback signal and a reference signal;
    means for comparing the error signal to the current magnitude signal, and for turning off the switching transistor when the current magnitude signal exceeds the error signal; and
    means for applying the error signal to the second function terminal, whereby the magnitude of the error signal may be controlled by a network of one or more external components connected to the second function terminal.

18. The integrated circuit of claim 17, wherein the network of external components connected to the second function terminal includes a frequency compensating capacitor.

19. The integrated circuit of claim 17, wherein the network of external components connected to the second function terminal includes a frequency compensation capacitor in series with a resistor.

20. The integrated circuit of claim 17, wherein the network of external components connected to the second function terminal prevents the error signal at the second function terminal from exceeding a predetermined maximum level, thereby limiting to a maximum peak value the magnitude of current conducted by the switching transistor.

21. The integrated circuit of claim 20, wherein the network of external components establishes a predetermined maximum voltage at the second function terminal.

22. The integrated circuit of claim 17, wherein the network of external components connected to the second function terminal variably controls the voltage at the second function terminal as a function of time, thereby variably limiting as a function of time the current conducted by the switching transistor.

23. The integrated circuit of claim 22, wherein the network of external components for variably controlling the voltage at the second function terminal includes:
    a resistor connected between a first node and a second node;
    a capacitor connected between the second node and the ground terminal; and
    means connected between the second node and the second function terminal for applying at least a portion of a voltage at the second node to the second function terminal, such that the voltage at the second function terminal upon application of a voltage at the first node gradually increases with time to gradually increase the current conducted by the switching transistor.

24. The integrated circuit of claim 17, the integrated circuit further having voltage regulator circuitry for providing a regulated voltage to at least portions of the internal drive circuitry, and wherein said fourth means further includes:
    means for producing second reference signal;
    means for comparing the second reference signal to a shutdown control signal applied to the second function terminal by the external components, and for generating a shutdown signal when the second reference signal and the shutdown control signal differ by a predetermined amount; and
    means responsive to the shutdown signal for disabling at least the voltage regulator circuitry, thereby shutting down and reducing the current drawn by the integrated circuit.

25. The integrated circuit of claim 24, wherein the shutdown control signal is a voltage, and wherein:
    said means for producing a second reference signal includes a diode having a first forward voltage drop; and wherein
    said means for comparing the second reference signal to the shutdown control signal includes a transistor having a base-emitter circuit connected between said diode and the second function terminal, the base-emitter circuit having a second forward voltage drop which differs from the first forward voltage drop, and said transistor being adapted to disable the voltage regulator circuitry when the shutdown control signal voltage at the second function terminal is less than the difference between the first and second forward voltage drops.

26. An integrated circuit for use in implementing a switching voltage regulator providing a regulated output voltage, the integrated circuit having a power switching transistor, circuitry for driving the switching transistor and control circuitry for varying the on and off switching duty cycle of the switching transistor, and further having for connection to external components an input terminal, an output terminal, a ground terminal and a function terminal, the integrated circuit comprising:
    first means connected to the function terminal and to the control circuitry for accepting a first feedback signal indicative of the regulated output voltage, and for enabling the integrated circuit to operate in a normal feedback mode to regulate the regulated output voltage by varying the duty cycle of the switching transistor as a function of the magnitude of the first feedback signal;

second means connected to at least one of the terminals and to the control circuitry for accepting a second feedback signal indicative of a voltage developed across a winding of an external transformer, and for enabling the integrated circuit to operate in a fully isolated flyback mode to regulate the output voltage as a function of the magnitude of the second feedback signal; and mode select means connected to the function terminal and to said first and second means to disable one of the first and second means and to enable the other in response to a mode select control signal applied to the function terminal by external components.

27. The integrated circuit of claim 26, wherein said first means includes:
means for producing a first reference signal; and
means for detecting a difference between the first feedback signal and the first reference signal, and for generating an error signal indicative of that difference;
and wherein the control circuitry includes:
means for comparing the error signal to a signal indicative of the magnitude of current conducted by the switching transistor; and
means responsive to said comparing means for turning off the switching transistor when the current magnitude signal exceeds the error signal.

28. The integrated circuit of claim 26, wherein said second means includes:
means responsive to the second feedback signal for generating an error signal indicative of a difference between the second feedback signal and a predetermined threshold signal level;
and wherein the control circuitry includes:
means for comparing the error signal to a signal indicative of the magnitude of current conducted by the switching transistor; and
means responsive to said comparing means for turning off the switching transistor when the current magnitude signal exceeds the error signal.

29. The integrated circuit of claim 26, wherein said first means includes:
means for producing a first reference signal; and
means for detecting a difference between the first feedback signal and the first reference signal, and for generating a first error signal indicative of that difference;
wherein said second means includes:
means responsive to the second feedback signal for generating a second error signal indicative of a difference between the second feedback signal and a predetermined threshold signal level;
and wherein the control circuitry includes:
means for receiving the first and second error signals, and for comparing at any given time one of the first and second error signals to a signal indicative of the magnitude of current conducted by the switching transistor; and
means responsive to said comparing means for turning off the switching transistor when the current magnitude signal exceeds the compared one of the first and second error signals.

30. The integrated circuit of claim 27, wherein said means for generating an error signal includes a differential amplifier having a first input for receiving the first feedback signal and a second input for receiving the first reference signal.

31. The circuit of claim 28, wherein said means for generating the second feedback error signal includes:
an amplifier having a first input connected to one of the input and output terminals; and
means connected to a second input of said amplifier and to the other of the input and output terminals for establishing a threshold voltage, whereby a voltage differential is established across the inputs of the amplifier when a voltage difference between the input and output terminals exceeds the threshold voltage.

32. The circuit of claim 31, wherein said means for establishing a threshold voltage includes a zener diode.

33. The circuit of claim 32, wherein said zener diode has a zener breakdown voltage, and wherein said means of establishing a threshold voltage further includes:
means for establishing a trimming voltage in series with the zener breakdown voltage such that at least a part of the threshold voltage is comprised of the sum of the trimming and zener breakdown voltages; and
means connected to said means for establishing a trimming voltage, and to the function terminal, for varying the trimming voltage in response to a signal at the function terminal, thereby varying the threshold voltage.

34. The circuit of claim 33 wherein:
said means for establishing a trimming voltage comprises a resistor; and wherein
said means for varying the trimming voltage varies a current conducted by said trimming voltage resistor as a function of a current conducted by the function terminal.

35. The circuit of claim 34, wherein the current conducted by the function terminal is established at least in part by external components connected to the function terminal.

36. The circuit of claim 35, wherein the external components connected to the function terminal include a resistor connected to ground.

37. The circuit of claim 26, wherein said mode select means is connected to the function terminal.

38. The circuit of claim 37, wherein said mode select means includes:
means for sensing current conducted by the function terminal; and
means responsive to said sensing means for disabling said first means and enabling said second means when the current sensed by said sensing means exceeds a predetermined threshold current.

39. The circuit of claim 38, wherein the function terminal is connected to external components adapted to conduct a current which exceeds the threshold current.

40. An integrated circuit for use in implementing a switching voltage regulator providing a regulated output voltage, the integrated circuit having a power switching transistor, circuitry for driving the switching transistor and control circuitry for varying the on and off switching duty cycle of the switching transistor, and further having at most five terminals for connection to external components consisting of an input terminal, an output terminal, a ground terminal and first and second function terminal, the integrated circuit comprising:
first means connected to the first function terminal and to the control circuitry for accepting a first feedback signal indicative of the regulated output voltage, and for enabling the integrated circuit to operate in a normal feedback mode to regulate the regulated output voltage by varying the duty cycle of the switching transistor as a function of the magnitude of the first feedback signal;

second means connected to at least one of the input and output terminals and to the control circuitry for accepting a second feedback signal indicative of a voltage developed across a winding of an external transformer, and for enabling the integrated circuit to operate in a fully isolated flyback mode to regulate the regulated output voltage as a function of the magnitude of the second feedback signal;

mode select means connected to the first function terminal and to said first and second means to disable one of the first and second means and to enable the other in response to a mode select control signal applied to the first function terminal by external components; and means connected to the control circuitry and to the second function terminal for enabling the switching voltage regulator circuit in response to signals applied to the second function terminal by a network of external components to be frequency compensated.

41. The integrated circuit of claim 40, wherein said first means includes:
means for producing a first reference signal; and
means for detecting a difference between the first feedback signal and the first reference signal, and for generating an error signal indicative of that difference;
and wherein the control circuitry includes:
means for comparing the error signal to a signal indicative of the magnitude of current conducted by the switching transistor; and
means responsive to said comparing means for turning off the switching transistor when the current magnitude signal exceeds the error signal.

42. The integrated circuit of claim 40, wherein said second means includes:
means responsive to the second feedback signal for generating an error signal indicative of a difference between the second feedback signal and a predetermined threshold signal level;
and wherein the control circuitry includes:
means for comparing the error signal to a signal indicative of the magnitude of current conducted by the switching transistor; and
means responsive to said comparing means for turning off the switching transistor when the current magnitude signal exceeds the error signal.

43. The integrated circuit of claim 40, wherein said first means includes:
means for producing a first reference signal; and
means for detecting a difference between the first feedback signal and the first reference signal, and for generating a first error signal indicative of that difference;
wherein said second means includes:
means responsive to the second feedback signal for generating a second error signal indicative of a difference between the second feedback signal and a predetermined threshold signal level;
and wherein the control circuitry includes:
means for receiving the first and second error signals, for comparing at any given time one of the first and second error signals to a signal indicative of the magnitude of current conducted by the switching transistor; and
means responsive to said comparing means for turning off the switching transistor when the current magnitude signal exceeds the compared one of the first and second error signals.

44. The integrated circuit of claim 40, wherein said means for generating an error signal includes a differential amplifier having a first input for receiving the first feedback signal and a second input for receiving the first reference signal.

45. The circuit of claim 42, wherein said means for generating the second feedback error signal includes:
an amplifier having a first input connected to one of the input and output terminals; and
means connected to a second input of said amplifier and to the other of the input and output terminals for establishing a threshold voltage, whereby a voltage differential is established across the inputs of the amplifier when a voltage difference between the input and output terminals exceeds the threshold voltage.

46. The circuit of claim 45, wherein said means for establishing a threshold voltage includes a zener diode.

47. The circuit of claim 46, wherein said zener diode has a zener breakdown voltage, and wherein said means for establishing a threshold voltage further includes:
means for establishing a trimming voltage in series with the zener breakdown voltage such that at least a part of the threshold voltage is comprised of the sum of the trimming and zener breakdown voltages; and
means connected to said means for establishing a trimming voltage, and to one of the function terminals, for varying the trimming voltage in response to a signal at that function terminal, thereby varying the threshold voltage.

48. The circuit of claim 47, wherein said means for varying the trimming voltage is connected to the first function terminal.

49. The circuit of claim 48, wherein:
said means of establishing a trimming voltage comprises a resistor; and wherein
said means for varying the trimming voltage varies a current conducted by said trimming voltage resistor as a function of a current conducted by the first function terminal.

50. The circuit of claim 49, wherein the current conducted by the first function terminal is established at least in part by external components connected to the first function terminal.

51. The circuit of claim 50, wherein the external components connected to the first function terminal include a resistor connected to ground.

52. The circuit of claim 40, wherein said mode select means is connected to the first function terminal.

53. The circuit of claim 40, wherein said mode select means includes:
means for sensing current conducted by the first function terminal; and
means responsive to said sensing means for disabling said first means and enabling said second means when the current sensed by said sensing means exceeds a predetermined threshold current.

54. The integrated circuit of claim 39, wherein the network of external components connected to the second function terminal includes a frequency compensating capacitor.

55. The integrated circuit of claim 40, wherein the network of external components connected to the second function terminal includes a frequency compensation capacitor in series with a resistor.

56. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, and further having input and ground terminals for connection to a source of input power, an output terminal for connection to external components adapted to convert the pulsed output of the switching transistor into the regulated output voltage, and first and second multi-function terminals for connection to external components adapted to apply control signals to the multi-function terminals, the integrated circuit comprising:

first means responsive to control signals applied to the first multi-function terminal, said first means including at least two of:
(a) means for controlling the duty cycle of the switching transistor when the integrated circuit is operating in a normal feedback mode,
(b) means for programming the integrated circuit to operate in one of a normal feedback mode and a fully-isolated flyback mode, and
(c) means for trimming a flyback voltage developed across a winding of an external transformer when the integrated circuit operates in a fully-isolated flyback mode; and second means responsive to control signals applied to the second multi-function terminal for performing at least two of:
(a) frequency compensating the integrated circuit,
(b) limiting peak current conducted by the switching transistor,
(c) variably limiting current conducted by the switching transistor as a function of time, and
(d) shutting down the integrated circuit, whereby current drawn by the integrated circuit is reduced.

57. The integrated circuit of claim 56, wherein said normal feedback mode controlling means includes:
means for producing a first reference signal;
means for generating a feedback mode error signal indicative of a difference between the first reference signal and a feedback signal applied to the first multi-function terminal indicative of the magnitude of the regulated output voltage;
means for comparing the feedback mode error signal to a signal indicative of the magnitude of current conducted by the switching transistor; and
means responsive to said comparing means for turning off the switching transistor when the current magnitude signal exceeds the error signal, whereby the duty cycle of the switching transistor is controlled as a function of the feedback signal.

58. The integrated circuit of claim 56, wherein said programming means includes:
means for controlling the duty cycle of the switching transistor when the integrated circuit operates in a fully-isolated flyback mode; and
means connected to the first multi-function terminal for sensing a mode-select signal at the first multi-function terminal and for responsively disabling said normal feedback mode controlling means and enabling said flyback mode controlling means.

59. The integrated circuit of claim 58, wherein said flyback mode controlling means includes:
means connected to the input and output terminals for receiving a flyback signal indicative of a voltage developed across the winding of the external transformer, and for generating a flyback mode error signal indicative of a difference between the flyback signal and a threshold signal level;
means for comparing the flyback mode error signal to a signal indicative of the magnitude of current conducted by the switching transistor; and
means responsive to the output of said comparing means for turning off the switching transistor when the current magnitude signal exceeds the error signal, whereby the duty cycle of the switching transistor is controlled as a function of the flyback signal.

60. The integrated circuit of claim 59, wherein said trimming means includes:
means connected to the first multi-function terminal for sensing a trimming control signal; and
means connected to said trimming control signal sensing means and to said flyback mode error signal generating means for trimming the magnitude of the threshold signal in response to the trimming control signal, thereby trimming the flyback voltage.

61. The integrated circuit of claim 56, wherein said second means includes:
means for generating a signal indicative of the magnitude of current conducted by the switching transistor;
means connected to at least one terminal of the integrated circuit for sensing a feedback signal indicative of the magnitude of at least one of the regulated output voltage and the voltage developed across the winding of the external transformer, and for generating an error signal indicative of the difference between the feedback signal and a reference signal;
means for comparing the error signal to the current magnitude signal, and for turning off the switching transistor when the current magnitude signal exceeds the error signal; and
means for applying the error signal to the second multi-function terminal, whereby the magnitude of the error signal may be controlled by a network of one or more external components connected to the second multi-function terminal.

62. The integrated circuit of claim 61, wherein the network of external components connected to the second multi-function terminal includes a frequency compensating capacitor.

63. The integrated circuit of claim 61, wherein the network of external components connected to the second multi-function terminal includes a frequency compensation capacitor in series with a resistor.

64. The integrated circuit of claim 61, wherein the network of external components connected to the second multi-function terminal prevents the error signal at the second multi-function terminal from exceeding a predetermined maximum level, thereby limiting to a maximum peak value the magnitude of current conducted by the switching transistor.

65. The integrated circuit of claim 62, wherein the network of external components establishes a predetermined maximum voltage at the second multi-function terminal.

66. The integrated circuit of claim 61, wherein the network of external components connected to the second multi-function terminal variably controls the voltage at the second multi-function terminal as a function of time, thereby variably limiting as a function of time the current conducted by the switching transistor.

67. The integrated circuit of claim 66, wherein the network of external components for variably controlling the voltage at the second multi-function terminal includes:
- a resistor connected between a first node and a second node;
- a capacitor connected between the second node and the ground terminal; and
- means connected between the second node and the second multi-function terminal for applying at least a portion of a voltage at the second node to the second multi-function terminal, such that the voltage at the second multi-function terminal upon application of a voltage at the first node gradually increases with time to gradually increase the current conducted by the switching transistor.

68. The integrated circuit of claim 56, the integrated circuit further having voltage regulator circuitry for providing a regulated voltage to at least portions of the internal Circuitry, wherein said second means further includes:
- means for producing a second reference signal;
- means for comparing the second reference signal to a shutdown control signal applied to the second multi-function terminal by the external components, and for generating a shutdown signal when the second reference signal and the shutdown control signal differ by a predetermined amount; and
- means responsive to the shutdown signal for disabling at least the voltage regulator circuitry, thereby shutting down and reducing the current drawn by the integrated circuit.

69. The integrated circuit of claim 68, wherein the shutdown control signal is a voltage, and wherein:
- said means for producing a second reference signal includes a diode having a first forward voltage drop; and wherein
- said comparing means includes a transistor having a base-emitter circuit connected between said diode and the second multi-function terminal, the base-emitter circuit having a second forward voltage drop which differs from the first forward voltage drop, and said transistor being adapted to disable the voltage regulator circuitry when the shutdown control signal voltage at the second multi-function terminal is less than the difference between the first and second forward voltage drops.

70. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, and further having input and ground terminals for connection to a source of input voltage and current, an output terminal for connection to external components adapted to convert the pulsed output of the switching transistor into the regulated output voltage, and first and second multi-function terminals for connection to external components adapted to apply control signals to the multi-function terminals, the integrated circuit comprising:
- first means responsive to control signals applied to the first multi-function terminal, said first means including:
  - (a) means for controlling the duty cycle of the switching transistor when the integrated circuit operates in a normal feedback mode,
  - (b) means for programming the integrated circuit to operate in one of a normal feedback mode and a fully-isolated flyback mode, and
  - (c) means for trimming a flyback voltage developed across a winding of an external transformer when the integrated circuit operates in a fully-isolated flyback mode; and
- second means responsive to control signals applied to the second multi-function terminal for:
  - (a) frequency compensating the integrated circuit,
  - (b) limiting peak current conducted by the switching transistor,
  - (c) variably limiting current conducted by the switching transistor as a function of time, and
  - (d) shutting down the integrated circuit, whereby current drawn by the integrated circuit is reduced.

71. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, and further having input and ground terminals for connection to a source of input voltage and current, an output terminal for connection to external components adapted to convert the pulsed output of the switching transistor into the regulated output voltage, and first and second multi-function terminals for connection to external components adapted to apply control signals to the multi-function terminals, the integrated circuit comprising:
- first means responsive to control signals applied to the first multi-function terminal, said first means including:
  - (a) means for controlling the duty cycle of the switching transistor when the integrated circuit operates in a normal feedback mode,
  - (b) means for programming the integrated circuit to operate in one of a normal feedback mode and a fully-isolated flyback mode, and
  - (c) means for trimming a flyback voltage developed across a winding of an external transformer when the integrated circuit operates in a fully-isolated flyback mode; and
- second means responsive to control signals applied to the second multi-function terminal for:
  - (a) frequency compensating the integrated circuit,
  - (b) limiting peak current conducted by the switching transistor, and
  - (c) variably limiting current conducted by the switching transistor as a function of time.

72. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, and further having input and ground terminals for connection to a source of input voltage and current, an output terminal for connection to external components adapted to convert the pulsed output of the switching transistor into the regulated output voltage, and first and second multi-function terminals for connection to external components adapted to apply control signals to the multi-function terminals, the integrated circuit comprising:

first means responsive to control signals applied to the first multi-function terminal, said first means including:
  (a) means for controlling the duty cycle of the switching transistor when the integrated circuit operates in a normal feedback mode, and
  (b) means for programming the integrated circuit to operate in one of a normal feedback mode and a fully-isolated flyback mode; and
second means responsive to control signals applied to the second multi-function terminal for:
  (a) frequency compensating the integrated circuit,
  (b) limiting peak current conducted by the switching transistor,
  (c) variably limiting current conducted by the switching transistor as a function of time, and
  (d) shutting down the integrated circuit, whereby current drawn by the integrated circuit is reduced.

73. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, and further having input and ground terminals for connection to a source of input voltage and current, an output terminal for connection to external components adapted to convert the pulsed output of the switching transistor into the regulated output voltage, and first and second function terminals for connection to external components adapted to apply control signals to the function terminals, the integrated circuit comprising:

first means responsive to a control signal applied to the first function terminal for controlling the duty cycle of the switching transistor as a function of the magnitude of the regulated output voltage; and
second means responsive to control signals applied to the second function terminal for:
  (a) frequency compensating the integrated circuit,
  (b) limiting current conducted by the switching transistor,
  (c) variably limiting current conducted by the switching transistor as a function of time, and
  (d) shutting down the integrated circuit, whereby current drawn by the integrated circuit is reduced.

74. An integrated circuit for use in implementing a switching voltage regulator providing a regulated output voltage, the integrated circuit having internal drive circuitry power switching transistor and control circuitry for controlling the on and off duty cycle of the switching transistor to produce a pulsed output, and further having input and ground terminals for connection to a source of input voltage and current, an output terminal for connection to external components adapted to convert the pulsed output of the switching transistor into the regulated output voltage, and first and second multi-function terminals for connection to external components adapted to apply control signals to the multi-function terminals, the integrated circuit comprising:

first means responsive to control signals applied to the first multi-function terminal, said first means including:
  (a) means for controlling the duty cycle of the switching transistor when the integrated circuit operates in a normal feedback mode, and
  (b) means for programming the integrated circuit to operate in one of a normal feedback mode and a fully-isolated flyback mode;
second means responsive to control signals applied to the second multi-function terminal for:
  (a) frequency compensating the integrated circuit,
  (b) limiting peak current conducted by the switching transistor, and
  (c) variably limiting current conducted by the switching transistor as a function of time.

75. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, and output terminal for connection to external components adapted to convert the pulsed output of the switching transistor into the regulated output voltage, and first and second multi-function terminals for connection to external components adapted to apply control signals to the multi-function terminals;
first means responsive to control signals applied to the first multi-function terminal, said first means including at least two of:
  (a) means for controlling the duty cycle of the switching transistor when the integrated circuit is operating in a normal feedback mode,
  (b) means for programming the integrated circuit to operate in one of a normal feedback mode and a fully-isolated flyback mode, and
  (c) means for trimming a flyback voltage developed across a winding of an external transformer when the integrated circuit operates in a fully-isolated flyback mode; and
second means responsive to control signals applied to the second multi-function terminal for performing at least two of:
  (a) frequency compensating the integrated circuit,
  (b) limiting peak current conducted by the switching transistor,
  (c) variably limiting current conducted by the switching transistor as a function of time, and
  (d) shutting down the integrated circuit, whereby current drawn by the integrated circuit is reduced.

76. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, an output terminal for connection to external components adapted to convert the pulsed output of the switching transistor into the regulated output voltage, and first and second multi-function terminals for connection to external components adapted to apply control signals to the multi-function terminals;

first means responsive to control signals applied to the first multi-function terminal, said first means including:
- (a) means for controlling the duty cycle of the switching transistor when the integrated circuit is operating in a normal feedback mode,
- (b) means for programming the integrated circuit to operate in one of a normal feedback mode and a fully-isolated flyback mode, and
- (c) means for trimming a flyback voltage developed across a winding of an external transformer when the integrated circuit operates in a fully-isolated flyback mode, and second means responsive to control signals applied to the second multi-function terminal for:
- (a) frequency compensating the integrated circuit,
- (b) limiting peak current conducted by the switching transistor,
- (c) variably limiting current conducted by the switching transistor as a function of time, and
- (d) shutting down the integrated circuit, whereby current drawn by the integrated circuit is reduced.

77. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, an output terminal for connection to external components adapted to convert the pulsed output of the switching transistor into the regulated output voltage, and first and second multi-function terminals for connection to external components adapted to apply control signals to the multi-function terminals;

first means responsive to control signals applied to the first multi-function terminal, said first means including:
- (a) means for controlling the duty cycle of the switching transistor when the integrated circuit is operating in a normal feedback mode,
- (b) means for programming the integrated circuit to operate in one of a normal feedback mode and a fully-isolated flyback mode, and
- (c) means for trimming a flyback voltage developed across a winding of an external transformer when the integrated circuit operates in a fully-isolated flyback mode; and second means responsive to control signals applied to the second multi-function terminal for performing at least two of:
- (a) frequency compensating the integrated circuit,
- (b) limiting peak current conducted by the switching transistor, and
- (c) variably limiting current conducted by the switching transistor as a function of time.

78. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, an output terminal for connection to external components adapted to convert the pulsed output of the switching transistor into the regulated output voltage, and first and second multi-function terminals for connection to external components adapted to apply control signals to the multi-function terminals;

first means responsive to control signals applied to the first multi-function terminal, said first means including at least two of:
- (a) means for controlling the duty cycle of the switching transistor when the integrated circuit is operating in a normal feedback mode, and
- (b) means for programming the integrated circuit to operate in one of a normal feedback mode and a fully-isolated flyback mode; and second means responsive to control signals applied to the second multi-function terminal for performing at least two of:
- (a) frequency compensating the integrated circuit,
- (b) limiting peak current conducted by the switching transistor,
- (c) variably limiting current conducted by the switching transistor as a function of time, and
- (d) shutting down the integrated circuit, whereby current drawn by the integrated circuit is reduced.

79. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, an output terminal for connection to external components adapted to convert the pulsed output of the switching transistor into the regulated output voltage, and first and second function terminals for connection to external components adapted to apply control signals to the function terminals;

first means responsive to control signals applied to the first function terminal for controlling the duty cycle of the switching transistor as a function of the magnitude of the regulated output voltage; and second means responsive to control signals applied to the second function terminal for:
- (a) frequency compensating the integrated circuit,
- (b) limiting peak current conducted by the switching transistor,
- (c) variably limiting current conducted by the switching transistor as a function of time, and
- (d) shutting down the integrated circuit, where current drawn by the integrated circuit is reduced.

80. An integrated circuit for use in implementing a switching voltage regulator providing a regulated output voltage, the integrated circuit having internal drive circuitry, a power switching transistor and control circuitry for controlling the on and off duty cycle of the switching transistor to produce a pulsed output, the integrated circuit comprising:

at most five terminals for connection to external components, including input and ground terminals for connection to a source of input power, an output terminal for connection to external components adapted to convert the pulsed output of the switching transistor into the regulated output voltage, and first and second multi-function terminals for connection to external components adapted to apply control signals to the multi-function terminals;

first means responsive to control signals applied to the first multi-function terminal, said first means including:
  (a) means for controlling the duty cycle of the switching transistor when the integrated circuit is operating in a normal feedback mode, and
  (b) means for programming the integrated circuit to operate in one of a normal feedback mode and a fully-isolated flyback mode; and second means responsive to control signals applied to the second multi-function terminal for performing at least two of:
  (a) frequency compensating the integrated circuit,
  (b) limiting peak current conducted by the switching transistor, and
  (c) variably limiting current conducted by the switching transistor as a function of time.

81. An integrated circuit capable of implementing a current-mode normal feedback switching voltage regulator and a current-mode fully isolated flyback switching voltage regulator, the integrated circuit having a switching transistor, circuitry for driving the switching transistor, and control circuitry for controlling the on and off duty cycle of the switching transistor to produce a pulsed output, the integrated circuit comprising:

at most five terminals for connection to external components, including:

(a) input and ground terminals, connected to the integrated circuitry, for connection to a source of input voltage and current;

(b) an output terminal, connected to the switching transistor, for connection to external components adapted to convert the pulsed output of the switching transistor into the regulated output voltage;

(c) a first multi-function terminal responsive to control signals applied by external components connected to the first multi-function terminal for performing at least two functions selected from the group of:
  (1) controlling the duty cycle of the switching transistor when the integrated circuit is operating in a normal feedback mode,
  (2) programming the integrated circuit to operate in one of a normal feedback mode and fully-isolated flyback mode, and
  (3) trimming a flyback voltage developed across a winding of an external transformer when the integrated circuit operates in a fully-isolated flyback mode; and (d) a second multi-function terminal, responsive to control signals applied by external components connected to the second multi-function terminal, for performing at least two functions selected from the group of:
  (1) frequency compensating the integrated circuit,
  (2) limiting peak current conducted by the switching transistor,
  (3) variably limiting current conducted by the switching transistor as a function of time, and
  (4) shutting down the integrated circuit, whereby current drawn by the integrated circuit is reduced.

* * * * *